US011354027B2

(12) United States Patent
Gilra

(10) Patent No.: US 11,354,027 B2
(45) Date of Patent: Jun. 7, 2022

(54) AUTOMATIC ZOOM-LOUPE CREATION, SELECTION, LAYOUT, AND RENDERING BASED ON INTERACTION WITH CROP RECTANGLE

(71) Applicant: Adobe Inc., San Jose, CA (US)

(72) Inventor: Anant Gilra, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/157,346

(22) Filed: Jan. 25, 2021

(65) Prior Publication Data

US 2021/0216196 A1    Jul. 15, 2021

Related U.S. Application Data

(63) Continuation of application No. 16/546,964, filed on Aug. 21, 2019, now Pat. No. 10,901,589.

(51) Int. Cl.
*G06F 3/048* (2013.01)
*G06F 3/04845* (2022.01)
*G06F 3/0488* (2022.01)
*G06F 3/04842* (2022.01)

(52) U.S. Cl.
CPC ........ *G06F 3/04845* (2013.01); *G06F 3/0488* (2013.01); *G06F 3/04842* (2013.01); *G06F 2203/04806* (2013.01)

(58) Field of Classification Search
None
See application file for complete search history.

(56) References Cited

U.S. PATENT DOCUMENTS

| | | |
|---|---|---|
| 7,750,825 B2 | 7/2010 | Zuverink |
| 7,831,901 B1 | 11/2010 | Balev |
| 7,916,157 B1 | 3/2011 | Kelley et al. |
| 8,683,377 B2 | 3/2014 | Zuverink et al. |
| 8,819,556 B1 | 8/2014 | Balev |
| 8,924,851 B2 | 12/2014 | Wichmann |
| 10,901,589 B1 | 1/2021 | Gilra |

(Continued)

OTHER PUBLICATIONS

U.S. Appl. No. 16/546,964, Notice of Allowance, dated Sep. 3, 2020, 17 pages.

(Continued)

*Primary Examiner* — Tuan S Nguyen
(74) *Attorney, Agent, or Firm* — Kilpatrick Townsend & Stockton LLP

(57) ABSTRACT

Techniques described herein address the issue of inadequate view of areas of a crop rectangle for a user while cropping an image. The inadequate view may be due to the magnification of the image in the graphical user interface, the selection tool (e.g., the user's finger) blocking a portion of the image, or the like. The solution of zoom-loupes provide a view of the area around a specified point the user selects on the crop rectangle that may be magnified to assist the user to set the crop rectangle area precisely. The zoom-loupe is generated based on the location (e.g., corner or edge of the crop rectangle) of the specified point and is associated with the specified point using connector lines. The zoom-loupe is placed on the graphical user interface to avoid obstructing other views for the user and avoid collisions with other zoom-loupes.

20 Claims, 13 Drawing Sheets

(56) References Cited

U.S. PATENT DOCUMENTS

| | | | |
|---|---|---|---|
| 2005/0285880 A1* | 12/2005 | Lai | G06F 3/0481 |
| | | | 345/660 |
| 2006/0177132 A1* | 8/2006 | Jackson | H04N 1/3873 |
| | | | 382/173 |
| 2010/0287493 A1 | 11/2010 | Majumder et al. | |
| 2014/0362090 A1* | 12/2014 | Langoulant | G06F 3/04812 |
| | | | 345/467 |
| 2015/0135125 A1* | 5/2015 | Bhatt | G06F 3/0481 |
| | | | 715/781 |

OTHER PUBLICATIONS

U.S. Appl. No. 16/547,489, Non-Final Office Action, dated Feb. 11, 2021, 8 pages.

U.S. Appl. No. 16/547,489, Notice of Allowance, dated Mar. 17, 2021, 10 pages.

* cited by examiner

AUTOMATIC ZOOM-LOUPE CREATION, SELECTION, LAYOUT, AND RENDERING BASED ON INTERACTION WITH CROP RECTANGLE

CROSS-REFERENCE TO RELATED APPLICATION

This application is a continuation of U.S. Utility application Ser. No. 16/546,964, filed Aug. 21, 2019, entitled "AUTOMATIC ZOOM-LOUPE CREATION, SELECTION, LAYOUT, AND RENDERING BASED ON INTERACTION WITH CROP RECTANGLE." The present application is also related to U.S. Utility application Ser. No. 16/547,489, filed Aug. 21, 2019, entitled "DYNAMICALLY CHANGE TRACKER SPEED, SWITCH CROP RECTANGLES, AND DISPLAY INVISIBLE CORNERS VIA ZOOM-LOUPES." The entire contents of the Ser. Nos. 16/546,964 and 16/547,489 applications are herein incorporated by reference for all purposes.

BACKGROUND

Cropping an image in an image-editing tool using a graphical user interface is a commonly used function. It does not matter whether the user is a professional photographer, an amateur, or a first time image editor, when cropping an image the user generally would like to ensure that the cropped area is correctly represented. To perform a cropping function, a user typically adjusts the cropping area by modifying the size and location of a crop rectangle such that the portion of the image within the crop rectangle is retained while any portion of the image outside of the crop rectangle is removed (i.e., cropped). In some cases, the crop may need to be very precise.

BRIEF SUMMARY

In a typical cropping function, the user selects the corner or edge of the crop rectangle which can be moved to select the area for cropping out and/or keeping in the image. However, when modifying the crop area, it is sometimes difficult to see what exactly will be removed and what exactly will be kept in the image. This difficulty can be due to the magnification of the displayed image, the selection tool (such as the user's finger) blocking the user's view by obscuring a portion of the image, and other such problems. As a result, many users have to undo the cropping function and/or perform an iterative process of cropping multiple times to achieve the desired result.

Techniques described herein address the issue of inadequate view of areas of the crop rectangle due to magnification of the image in the graphical user interface while cropping, obstruction of the user's view because of the selection tool (e.g., the user's finger) blocking a portion of the image, or the like. Zoom-loupes provide a view of identified areas of the edge of the crop rectangle as selected by the user. Each zoom-loupe provides a view of the area around a specified point the user selects on the crop rectangle that may be magnified to assist the user to set the crop rectangle area precisely.

Techniques described herein include providing zoom-loupe functionality during a cropping function for a user to view selected areas of the image being cropped at a magnified factor to aid in the cropping selection process. In certain embodiments, the image editing system receives an indication of an interaction with a crop rectangle of an image being edited in a graphical user interface. The interaction may be, for example, a user selecting an edge or corner of the crop rectangle to resize the crop rectangle. In response to receiving the indication, the image editing system identifies a selection point on the crop rectangle based on the location of the interaction in the graphical user interface. The image editing system generates a zoom-loupe for displaying an area of the image based on the selection point at a magnification factor. The image editing system may dynamically determine a location on the graphical user interface relative to the location of the interaction for display of the zoom-loupe. The image editing system may then display the zoom-loupe at the determined location on the graphical user interface. The zoom-loupe can display the area of the image at the magnification factor dynamically to depict a first portion of the area of the image that will be cropped separated by a demarcation line from a second portion of the area of the image that will not be cropped.

In some embodiments, to generate the zoom-loupe the system determines whether the selection point corresponds to a corner point of the crop rectangle, an edge of the crop rectangle, or if it is not close enough to the crop rectangle to be considered a selection point for a zoom-loupe. If the interaction is within a threshold distance of the corner of the crop rectangle, the corner of the rectangle is identified as the selection point. If the interaction is not close to a corner of the crop rectangle but is sufficiently close to the crop rectangle, the closest point on the crop rectangle perpendicular to the actual touchpoint is identified as the selection point. If the interaction is not close enough to the crop rectangle to be considered selection of the crop rectangle, the interaction is ignored. The shape of the zoom-loupe is determined based on the selection point. For example, if the selection point is a corner of the crop rectangle, a square zoom-loupe is generated. If the selection point is on a horizontal edge of the crop rectangle, a rectangular zoom-loupe is generated that is longer in the horizontal direction, and if the selection point is on a vertical edge of the crop rectangle a rectangular zoom-loupe is generated that is longer in the vertical direction. The input dimensions of the image to display in the zoom-loupe are determined based on a zoom-loupe magnification factor and the shape of the zoom-loupe.

In some embodiments, the interaction is selection of the crop rectangle by a user with their finger on a touchscreen. Optionally, the portion of the image to be cropped as shown in the zoom-loupe is shaded to indicate it will be cropped, and/or the portion of the image to remain after the cropping function is complete may be shown as highlighted in the zoom-loupe. In some embodiments, a connector line connects the selection point to each end of the demarcation line. In some embodiments, the area within the connector lines is transparently shaded to allow the user to see any portion of the image underneath the area within the connector lines. In some embodiments, the zoom-loupe on the edge of the crop rectangle is dynamically adjusted in location and what is displayed based on the location of the interaction moving along an edge of the crop rectangle. For example, a user sliding their finger along the crop rectangle may show a zoom-loupe that follows the user's finger to magnify differing areas of the image.

In some embodiments, additional zoom-loupes for zoom points are displayed. In such embodiments, the image editing system receives selection of a touchpoint on an edge of the crop rectangle indicating a zoom point. The image editing system identifies a second location corresponding to the zoom point in the graphical user interface. The image editing system generates a second zoom-loupe for displaying a second area of the image corresponding to the zoom point. The image editing system determines a second location on the graphical user interface relative to the location of the zoom point and displays the second zoom-loupe at the second location on the graphical user interface. In some embodiments, the second zoom-loupe is dynamically located on in the graphical user interface to avoid overlapping the first zoom-loupe. In some embodiments, the first zoom-loupe and the second zoom-loupe are displayed only when the user's finger touches the screen. Implementations of the described techniques may include hardware, a method or process, or computer software on a computer-accessible medium.

The foregoing, together with other features and embodiments will become more apparent upon referring to the following specification, claims, and accompanying drawings.

DETAILED DESCRIPTION

Figure 1:
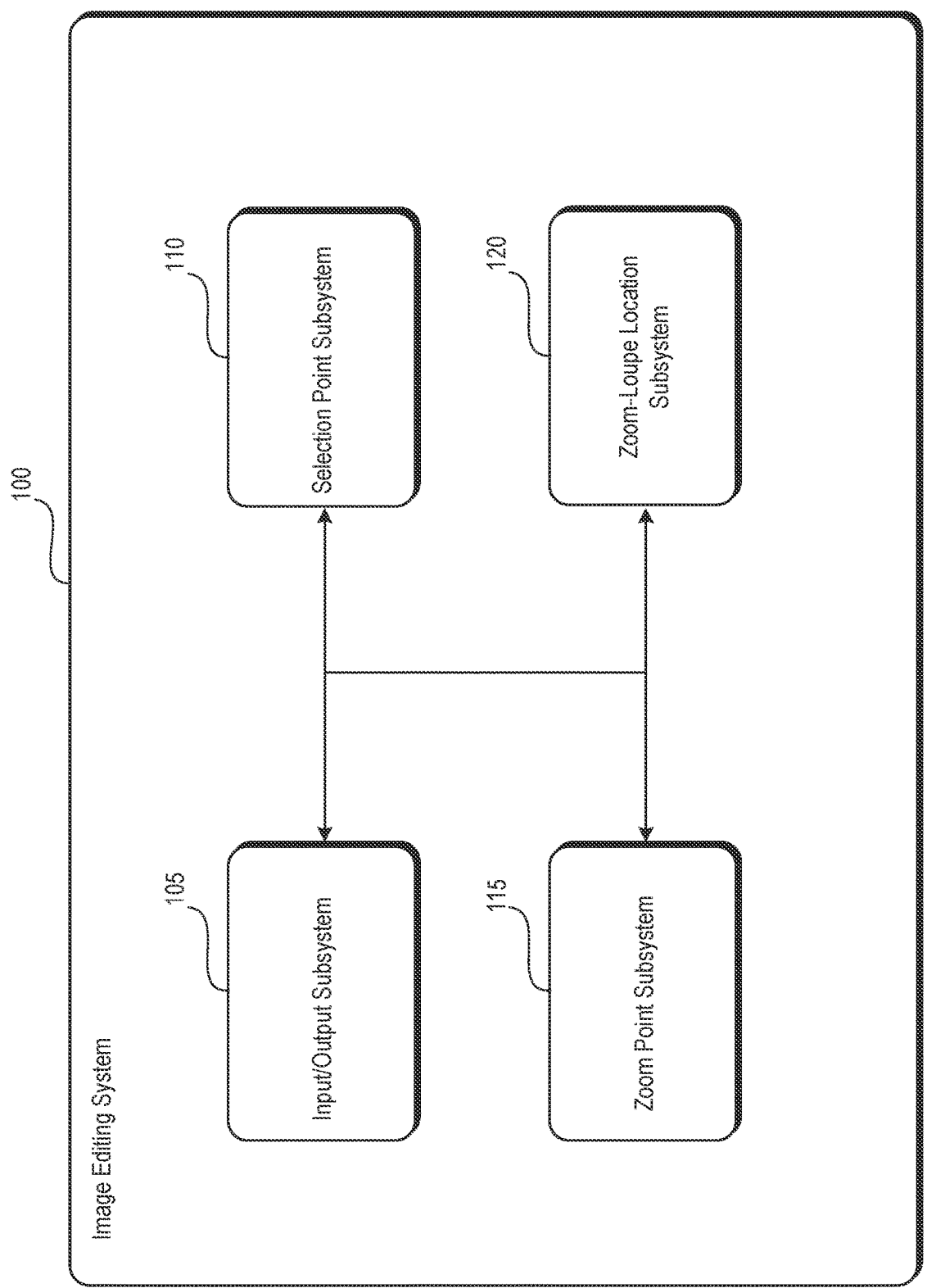
FIG. 1 illustrates a simplified block diagram of an image editing system, according to some embodiments.

In the following description, for the purposes of explanation, specific details are set forth to provide a thorough understanding of certain inventive embodiments. However, it will be apparent that various embodiments may be practiced without these specific details. The figures and description are not intended to be restrictive.

This disclosure relates generally to generating zoom-loupes, which are magnification points along the edge or at the corner of a crop rectangle for aiding the user in precisely sizing and placing the crop rectangle when performing image editing. The problem being addressed is that, in current implementations of image editing systems, when a user sizes a crop rectangle, a clear and/or close view of the edges and corners is not always available. For example, when using a touchscreen, the user's finger may obscure portions of the image. Further, depending on the magnification or zooming of the displayed image, details may be too small to see or the user may have magnified the image such that the overall image may be difficult to interpret. In these cases, the user must guess as to the sizing and often has to go through an iterative process to ensure the image is cropped properly.

A solution for this problem is to provide a zoom-loupe for the area under the selection point to alleviate the problem of the pointer or selector tool (e.g., the user's finger, a stylus, a mouse pointer, or the like) obscuring portions of the image. Additional zoom-point zoom-loupes can be displayed based on user configuration. The user can select zoom points along the edge or corners of the crop rectangle. The zoom-loupe for the selection point can be automatically generated based on the location of the selection point for resizing the crop rectangle. Once the user selects the crop rectangle at either an edge or a corner to resize the crop rectangle, the zoom-loupe for the selection point is generated and that zoom-loupe along with any zoom-loupes for any configured zoom points are displayed in a location on the screen that makes the zoom-loupe appear associated with its zoom point or selection point while minimizing the impact of the zoom-loupe on the cropping function. In other words, zoom-loupes are located on the screen so that they do not obscure the edge of the crop rectangle. The area of the image shown in each zoom-loupe is selected based on the associated selection point of the crop rectangle or the zoom point location, and the magnification of the image displayed in the zoom-loupe is automatically determined to provide appropriate magnification based on the magnification of the image being cropped as displayed in the graphical user interface. The zoom-point zoom-loupes are additionally positioned to avoid collision with each other and with the selection-point zoom-loupe. To ensure efficient processing, the zoom-point zoom-loupes can be generated upon selection of the zoom point and made visible when the selection point zoom-loupe is displayed (i.e., on mouse down). When the user releases the selection point (i.e., on mouse up), the zoom-point zoom-loupes can be hidden. In some embodiments, the zoom-point zoom-loupes may always be displayed during the cropping function.

This solution can be configured within any image editing system on any computer system. However, the solution is particularly useful for systems such as tablets or other wireless or mobile devices in which the user's finger or stylus is used for image editing and/or the available screen space is limited. For example, this solution may be configured within a mobile image editing application.

Referring to the drawings, FIG. 1 illustrates an image editing system 100. The image editing system 100 may include an input/output subsystem 105, a selection point subsystem 110, a zoom point subsystem 115, and a zoom-loupe location subsystem 120. Image editing system 100 may be implemented in a computer system such as computer system 1300 of FIG. 13. The image editing system may be an image editing application or program installed on computer system 1300 or served in a cloud based system such as that depicted in FIG. 12. While specific subsystems are described herein, the functionality described may be performed in more or fewer subsystems. In addition, other functionality performed by the image editing system 100 may be performed by other subsystems that have been excluded for the purposes of brevity and clarity.

Input/Output subsystem 105 may provide interface functionality to the screen or other input/output devices used to manipulate the image features within the image editing system 100. Examples of input/output devices include a screen for viewing the graphical user interface, a touchscreen for interacting with the graphical user interface with a finger or a stylus, a mouse, a keyboard, and/or the like. The input/output subsystem 105 may receive indications of interactions with the graphical user interface for processing by the image editing system 100. For example, an indication that the user has selected an edge or corner of a crop rectangle for resizing may be transmitted to the image editing system 100 through the input/output subsystem 105.

Selection point subsystem 110 may provide functionality for creating a selection-point zoom-loupe. The user may select a point on the crop rectangle to resize the crop area. Upon selecting the point on the crop rectangle, the selection point subsystem 110 receives an indication to create a zoom-loupe for the selection point from the input/output subsystem 105. The selection point subsystem 110 receives information including coordinates within the graphical user interface of the selection point. The selection point may not be precisely upon the crop rectangle. The selection point subsystem 110 can determine the coordinates to use for the selection point based on the coordinates of the actual selection point and the coordinates of the crop rectangle. If the actual selection point is not within a threshold distance from any point on the crop rectangle, the interaction is ignored. Such a distance may be calculated in number of pixels, for example, and is a sufficient number of pixels given the magnification factor of the image in the graphical user interface, such that the user is not likely trying to select the crop rectangle. When the interaction is ignored as unintentional, a zoom-loupe is not generated. If the actual selection point is within the threshold distance, the selection point subsystem 110 determines whether the user is attempting to select the edge of the crop rectangle or the corner of the crop rectangle. If the actual selection point is within a threshold distance from one of the corners of the crop rectangle, which may be calculated in number of pixels and may be the same or a smaller threshold than that used to ignore the interaction, the selection point used will be the corner of the crop rectangle. If the actual selection point is not within the threshold distance from the corner, the selection point used will be the closest point on the edge of the crop rectangle measured perpendicularly from the edge of the crop rectangle to the actual selection point. The selection point subsystem 110 uses the information including the size and magnification of the displayed image being cropped to create the zoom-loupe. To create the zoom-loupe, the selection point subsystem 110 determines the magnification factor, type of zoom-loupe, and area of the image for display within the zoom-loupe.

Before generation of the zoom-loupe, the image editing system 100 may generate a snapshot of the image being edited at an optimal resolution. The image displayed in the zoom-loupe can be selected from the snapshot to improve performance because the zoom-loupes need not be re-rendered over and over. The resolution of the snapshot is selected based on the magnification factor the image in the graphical user interface. If a magnification factor of the image in the graphical user interface is high (e.g., 200%), the resolution of the snapshot is higher than if the image in the graphical user interface is low (e.g., 50%). The snapshot can be reused for the zoom-loupes during mouse drags. The snapshot is regenerated when the user changes the magnification factor of the image in the graphical user interface.

The selection point subsystem may next determine the type and shape of zoom-loupe to generate. There are two types of zoom-loupes depending on the location of the selection point. An edge zoom-loupe is created when the user selects an edge of the crop rectangle that is a sufficient distance from a corner of the crop rectangle. If the selection point is very near the corner of the crop rectangle, a corner zoom-loupe is created.

A corner zoom-loupe is used to provide a zoom-loupe of a corner region of the crop rectangle. There are four different corners, so four different options for corner zoom-loupes. The corner zoom-loupes are approximately square, and in some embodiments may have rounded corners. The corner zoom-loupe, such as selection-point corner zoom-loupe 330 of FIG. 3, displays a portion of the snapshot that corresponds to the area of the image surrounding the selected corner of the crop rectangle. A portion of the image displayed in the zoom-loupe is within the crop area and a portion is outside the crop area. In other words, the crop rectangle divides the zoom-loupe using a demarcation line within the zoom-loupe. The portion within the demarcation line will remain after the crop function is complete (i.e., the non-cropped portion), and the portion outside the demarcation line will be removed by the crop function (i.e., the cropped portion). Approximately twenty-five percent (25%) of the zoom-loupe is outside the crop rectangle as depicted in the FIGS. However, any percentage of the zoom-loupe may be outside the crop rectangle, and in some embodiments, this may be a configurable option for the user to set. In some embodiments, the area outside the crop rectangle (on the cropped side of the demarcation line) is shaded to depict its removal by the crop function. In some embodiments, the area inside the crop rectangle (on the other side of the demarcation line) is highlighted in the zoom-loupe. In some embodiments, the demarcation line is not visible, but is instead only indicated by the shading and/or highlighting. In some embodiments, the shading or highlighting type and/or whether there is shading or highlighting may be configurable by the user. Corner selection points (and zoom points) are fixed to the exact corner of the crop rectangle.

An edge zoom-loupe is used to provide a zoom-loupe of an edge region of the crop rectangle. The edge zoom-loupe, such as selection-point edge zoom-loupe 230 of FIG. 2, displays a portion of the image surrounding a point on the edge of the crop rectangle that is closest to the selected point by the user. A portion of the image displayed in the zoom-loupe is within the crop area and a portion is outside the crop area. In other words, the crop rectangle divides the zoom-loupe using a demarcation line within the zoom-loupe. The portion within the demarcation line will remain after the crop function is complete, and the portion outside the demarcation line will be removed by the crop function. Approximately twenty-five percent (25%) of the zoom-loupe is outside the crop rectangle as depicted in the FIGS. However, any percentage of the zoom-loupe may be outside the crop rectangle, and in some embodiments, this may be a configurable option for the user to set. In some embodiments, the area outside the crop rectangle (on the cropped side of the demarcation line) is shaded to depict its removal by the crop function. In some embodiments, the area inside the crop rectangle (on the other side of the demarcation line) is highlighted in the zoom-loupe. In some embodiments, the demarcation line is not visible, but is instead only indicated by the shading and/or highlighting. In some embodiments, the shading and/or highlighting type and/or whether there is shading and/or highlighting may be configurable by the user. Edge zoom-loupes may move along the edge on which they reside. There are horizontal edge zoom-loupes and vertical edge zoom-loupes. The horizontal edge zoom-loupes are used on the top and bottom edges of the crop rectangle as viewed on the graphical user interface, and the vertical edge zoom-loupes are used on the left and right edges of the crop rectangle as viewed on the graphical user interface. If, for example, an edge zoom-loupe is on the right edge of the crop rectangle, the user may move the selection point along the right edge of the crop rectangle, and the selection-point zoom-loupe will follow the user's motion (e.g., with a mouse, the user's finger, the stylus, and so forth). The zoom-loupe may follow the motion at a fixed distance when possible. Zoom-loupe placement on the graphical user interface is discussed in more detail with respect to zoom-loupe location subsystem 120.

The magnification factor for each displayed zoom-loupe is selected such that the user can see enough of the image in the zoom-loupe to make an informed decision on the cropping function. For example, when the magnification factor of the displayed image is large (e.g., 200%), the magnification factor of the zoom-loupe will be, smaller (e.g., 50%). Generally, the magnification factor used in the zoom-loupe is inversely proportional to the magnification factor of the displayed image in the graphical user interface. Because the display in the zoom-loupe is selected from the snapshot, the magnification factor may be set with respect to the snapshot. The snapshot is generated based on the magnification factor of the image in the graphical user interface, so the magnification factor of the zoom-loupe is in turn based on the magnification factor of the displayed image via the snapshot.

The portion of the image displayed in the zoom-loupe is selected from the snapshot based on the selection point used on the crop rectangle. The coordinates of the selection point are associated with a specific point on the image being edited based on the displayed image, and that position corresponds to a location on the snapshot. For a vertical edge zoom-loupe, the specific point on the image is centered vertically within the zoom-loupe and placed approximately twenty-five percent of the way in from the outside edge of the zoom-loupe. For a horizontal edge zoom-loupe, the specific point on the image is centered vertically within the zoom-loupe and placed approximately twenty-five percent of the way in from the outside edge of the zoom-loupe. For a corner zoom-loupe, the specific point on the image is placed approximately twenty-five percent of the way in from each outside edge of the zoom-loupe. The area surrounding the specific point to fill the zoom-loupe at the desired magnification factor is then used to display in the zoom-loupe. In this way, approximately twenty-five percent of the image within the zoom-loupe is area that will be cropped by the crop function. While twenty-five percent is used, any percentage can be used if desired, and in some embodiments the user may be able to select the portion of the zoom-loupe dedicated to the area outsize the crop rectangle.

Additionally, the zoom-loupes dynamically change as the user resizes the crop rectangle. Accordingly, this process of determining which portion of the image is displayed changes as the user moves the selection point by resizing the crop rectangle. As the location of the selection point changes, the area of the image displayed in the zoom-loupe also changes. To account for resizing of the crop rectangle outside the image area of the graphical user interface, a gravity point is used to display the remaining portion of the image appropriately within the zoom-loupe. For example, the gravity point for the zoom-loupe in the upper right corner of the crop rectangle is the bottom left corner of the zoom-loupe. In this way, as the crop rectangle is moved up and to the right beyond the image boundaries, the portion of the image remaining to display within the crop rectangle appears in the lower left portion of the zoom-loupe. Other edges and corners are similarly configured. Accordingly, the gravity point of a zoom-loupe in the lower left corner of the crop rectangle is the upper right corner of the zoom-loupe. A top edge zoom-loupe gravity point is at the bottom of the zoom-loupe. Further, the gravity point may change for a zoom-loupe if, for example, a top edge zoom-loupe is moved to the far left of the crop rectangle, the gravity point will move to the bottom right of the zoom-loupe, but if that same zoom-loupe is moved to the far right of the crop rectangle, the gravity point will move to the bottom left of the zoom-loupe. Additionally, if a crop rectangle is flipped by a user, for example, dragging the top edge of the crop rectangle below the bottom edge, the gravity point will flip as well.

If the crop rectangle is resized to the point that there is no longer a portion of the image within the zoom-loupe, in some embodiments the zoom-loupe is no longer displayed when there is no image left to display while dragging the selection tool.

In some embodiments, in addition to the zoom-loupe, connector lines may be displayed that join the selection point to the demarcation line displayed in the zoom-loupe. For example, a connector line may connect one end of the demarcation line to the selection point (or zoom point) and a second connector line may connect the other end of the demarcation line to the selection point (or zoom point). The connector lines can help the user visually see that location of the selection point or zoom point and how it relates to the zoom-loupe. In some embodiments, the area enclosed within the connector lines and zoom-loupe has transparent shading such that the user may still see any portion of the image underneath the shaded area. The connector lines may also help the user associate zoom-loupes to differing zoom points that may be close together.

Zoom point subsystem 115 may provide functionality for creating a zoom-point zoom-loupe. The user may select zoom points on the edge or corner of the crop rectangle. The selection of zoom points may be done with, for example, a tap of the edge or corner of the crop rectangle. In some embodiments, an enable function may be made within a menu for the crop rectangle to enable zoom point selection. Once the user indicates selection of a zoom point, the zoom point subsystem 115 receives the indication to create a zoom-loupe for the zoom point or select an already existing zoom point and its corresponding zoom-loupe. The zoom point subsystem 115 receives information including coordinates within the graphical user interface of the zoom point. The zoom point subsystem 115 uses the information including the size and magnification of the displayed image being cropped to create the zoom-loupe. To create the zoom-loupe, the zoom point subsystem 115 determines the magnification factor, type of zoom-loupe, and area of the image for display within the zoom-loupe.

Creation of the zoom-point zoom-loupes is similar to creation of the selection-point zoom-loupes as described above. For example, the type of zoom-loupe is determined for a zoom-point zoom-loupe as for a selection-point zoom-loupe being either a corner or an edge. The magnification factor may also be determined for zoom-point zoom-loupes as for selection-point zoom-loupes. In some embodiments, the same magnification factor for the selection-point zoom-loupe is used for all zoom-loupes so additional calculation of the magnification factor is unnecessary for a zoom-point zoom-loupe.

Additionally, the selection of the portion of the image displayed in the zoom-point zoom-loupes is determined as described for the selection-point zoom-loupes. The zoom-point zoom-loupes also have a gravity point as described above to keep the displayed portion of the image in the appropriate location within the zoom-loupe with the crop rectangle begins to get near or past the edge of the image. The zoom-point zoom-loupes may also be removed/no longer displayed when there is no portion of the image displayed in the zoom-loupe based on the location of the crop rectangle. Additionally, in some embodiments, when the user releases the crop rectangle for resizing, the zoom-point zoom-loupes are no longer displayed. In some embodiments, while resizing the crop rectangle, if the user drags the crop rectangle beyond the size of the shaded region of the zoom-loupe beyond the edge of the displayed image, the zoom-point zoom-loupe is no longer displayed. The zoom-point zoom-loupes may also have the connector lines as described above.

If the user determines he would like to remove one or more zoom points, they may be removed by, for example, pressing the keyboardless modifier in a device while tapping the zoom point. In addition, the user may move a zoom point by selecting near the zoom point and sliding along the edge to move the zoom point. The user may completely reset/remove all zoom points by double tapping the screen, for example, or by selecting a reset menu function. Such a reset may also, for example, reset the crop rectangle to surround the entire image and restart the crop function. Each of these functions will generate an indication received by the input/output subsystem 105. The input/output subsystem 105 provides the indication to the zoom point subsystem 115 for processing.

The process for creating a zoom-point zoom-loupe is repeated for each selected zoom point. In some embodiments, the number of zoom points is limited to, for example, two per edge of the crop rectangle (e.g., two per top edge, two per bottom edge, two per right edge, and two per left edge). Limiting the number of zoom points may help stop the graphical user interface from becoming too crowded with zoom-loupes. In some embodiments in which the zoom points are limited, selection of a zoom point past the limited number may result in a notification on the graphical user interface that no additional zoom points may be selected on that edge. In some embodiments in which the zoom points are limited, selection of a zoom point past the limited number may result in removal of the next closest zoom point. In some embodiments, if two zoom points are selected very close to each other (e.g., within a distance such that both zoom-loupes would show an overlapping portion of the image), the zoom points are combined into a single zoom point. The single zoom point may be positioned centered between the two selected zoom points, for example or the first zoom point may be removed in favor of the second one.

Zoom-point zoom-loupes may be beneficial for multiple reasons. In some cases, a user may have zoomed into a small portion of the image and may move the crop rectangle. The zoom-point zoom-loupes provide a view at a helpful magnification factor of each selected zoom point on the edge of the crop rectangle, such that some zoom-loupes may be provided for areas of the image that are outside of the viewing area of the graphical user interface. Additionally, ensuring that specific objects within an image are included or excluded from the crop may be easier to accomplish by placing a zoom point on or near the object on the crop rectangle.

Zoom-loupe location subsystem 120 may provide functionality for determining a location for each zoom-loupe on the displayed graphical user interface. The location determination for each zoom-loupe, both zoom-point zoom-loupes and selection-point zoom-loupe, is dependent upon the available screen real estate for the graphical user interface as well as unused space within the graphical user interface for the cropping function. Zoom-loupe location subsystem 120 determines the location of the selection-point zoom-loupe first. The location of the selection-point zoom-loupe is based largely on the location of the selection point. The point nearest the selection point on the crop rectangle is an anchor point for the selection-point zoom-loupe. The selection-point zoom-loupe is located near, and if possible, centered vertically or horizontally with the selection point for edge zoom-loupes and at a forty-five degree angle from the corner of the crop rectangle for corner zoom-loupes. In some embodiments, if there is little screen real estate outside the crop rectangle, the zoom-loupe will be located within the crop rectangle. This is true for both edge and corner zoom-loupes.

Further, the location of the selection-point zoom-loupe may change dynamically for two reasons. The first reason may be that the user may change the size of the crop rectangle. This change affects both corner and edge zoom-loupes. As the size of the crop rectangle changes, the edge or corner of the crop rectangle may change location with respect to the image. As that changes, the area of the image displayed in the zoom-loupe dynamically changes to show the edge of the crop rectangle as that edge moves. Additionally, as the size of the crop rectangle becomes smaller, for example, the zoom-loupe may move to follow the edge or corner of the crop rectangle and remain a static distance from the crop rectangle. In some embodiments, as the crop rectangle becomes larger, for example, remaining a static distance from the crop rectangle becomes impossible as the zoom-loupe is pushed to the edge of the graphical user interface screen. In such cases, the zoom-loupe may change location and, if too little space outside the crop rectangle becomes available, the zoom-loupe may move to within the crop rectangle. In some embodiments, when the space for the zoom-loupe becomes limited on one axis (e.g., the horizontal axis), the angle may change from the zoom point or selection point so that space on the other axis (e.g., the vertical axis) is used. In modifying the location of the zoom-loupe with respect to the selection point or zoom point, connector lines will adjust to continue to connect the end of the demarcation line in the zoom-loupe with the selection point or zoom point.

The second reason the location of the edge selection-point zoom-loupes may change is because the user moves the selection point along the edge of the crop rectangle. Corner zoom-loupes are static and do not move with user movement along the edge of the crop rectangle. Along, for example, the top of the crop rectangle, the user may move the selection point right and left to dynamically view other portions of the image within the zoom-loupe. As the user moves the selection point, the portion of the image shown in the zoom-loupe dynamically changes based on the location of the selection point with respect to the image. Additionally, the location of the zoom-loupe moves left and right to follow the selection point, and when possible remains centered with the selection point either vertically or horizontally depending on the edge along which the selection point is moving.

Once the selection-point zoom-loupe is located on the graphical user interface, the zoom-point zoom-loupes are positioned. The same positioning techniques are used for the zoom-point zoom-loupes. For example, the zoom-point zoom-loupes are centered either vertically or horizontally with the associated zoom point when possible for edge zoom-loupes and at a forty-five degree angle from the corner of the crop rectangle for corner zoom-loupes. Zoom-point zoom-loupes also dynamically change as described above with respect to selection-point zoom-loupes when the user changes the size of the crop rectangle. Additionally, zoom-point zoom-loupes will dynamically change position to avoid collision with the selection-point zoom-loupe. For example, if the selection-point zoom-loupe would collide with the zoom-point zoom-loupe, the zoom-point zoom-loupe may be moved to avoid the collision. In some embodiments, when the selection-point zoom-loupe is changing position due to the user moving the selection point along the edge of the crop rectangle, the selection point may not be moved past a point that would cause a collision with an edge or corner zoom-point zoom-loupe. In other embodiments, the selection-point zoom-loupe may push the zoom-point zoom-loupe until the selection point is past the zoom point, and then the selection-point zoom-loupe swaps position with the zoom-point zoom-loupe. In other embodiments, the selection-point zoom-loupe may push the zoom-point zoom-loupe until the selection point and the zoom point are the same, and the selection point then becomes the zoom point, and the two zoom-loupes are combined so a single zoom-loupe is displayed. In such a situation, when the user releases the crop rectangle from resizing, the zoom point may remain, for example, at the location the user released it.

Selection points are temporary in that they do not remain on the image once the selection/resizing is released, and zoom points are permanent in that a user may select many zoom points that remain until the crop functionality is complete or the user moves or deletes them. However, if a user indicates a zoom point and then selects for resizing within a threshold distance from the zoom point, in some embodiments to avoid redundancy, the zoom point and selection point are combined to generate a single zoom-loupe. In some embodiments, the two are combined into a single selection point, and in other embodiments the two are combined into a single zoom point. Zoom-point zoom-loupes are maintained in memory and displayed only when the user moves an edge or corner of the crop rectangle, in some embodiments.

In some embodiments, the user may rotate the image being cropped as displayed in the graphical user interface. When the image is rotated, selection-point zoom-loupes may be displayed during and after rotation. In some embodiment, a lower resolution snapshot is generated and a lower resolution selection-point zoom-loupe is displayed during rotation to increase performance when the zoom-loupe is updated live during the rotation. In some embodiments, zoom-point zoom-loupes are not displayed during rotation. In some embodiments, the selection-point zoom-loupe may adjust location based on the rotation.

In some embodiments, the user may pan the image being cropped as displayed in the graphical user interface. When the image is panned, the selection-point zoom-loupe may be displayed. Zoom-point zoom-loupes may be displayed during pan if within the area of the displayed image on the graphical user interface. A new snapshot may not be needed on pan because a different portion of the snapshot may be available for use of the newly displayed area of the image in the graphical user interface.

In some embodiments, the user may change the magnification factor of the image being displayed. The snapshot originally generated may be used and recreation of the zoom-loupes may not be necessary or may at least still rely on the snapshot depending on the amount of the magnification factor change. If the magnification factor change is great (e.g., more than 10 percent), a new snapshot may be generated and all zoom-loupes are regenerated.

The following figures provide detailed example images and exemplary methods for generating the zoom-loupes.

Figure 2:
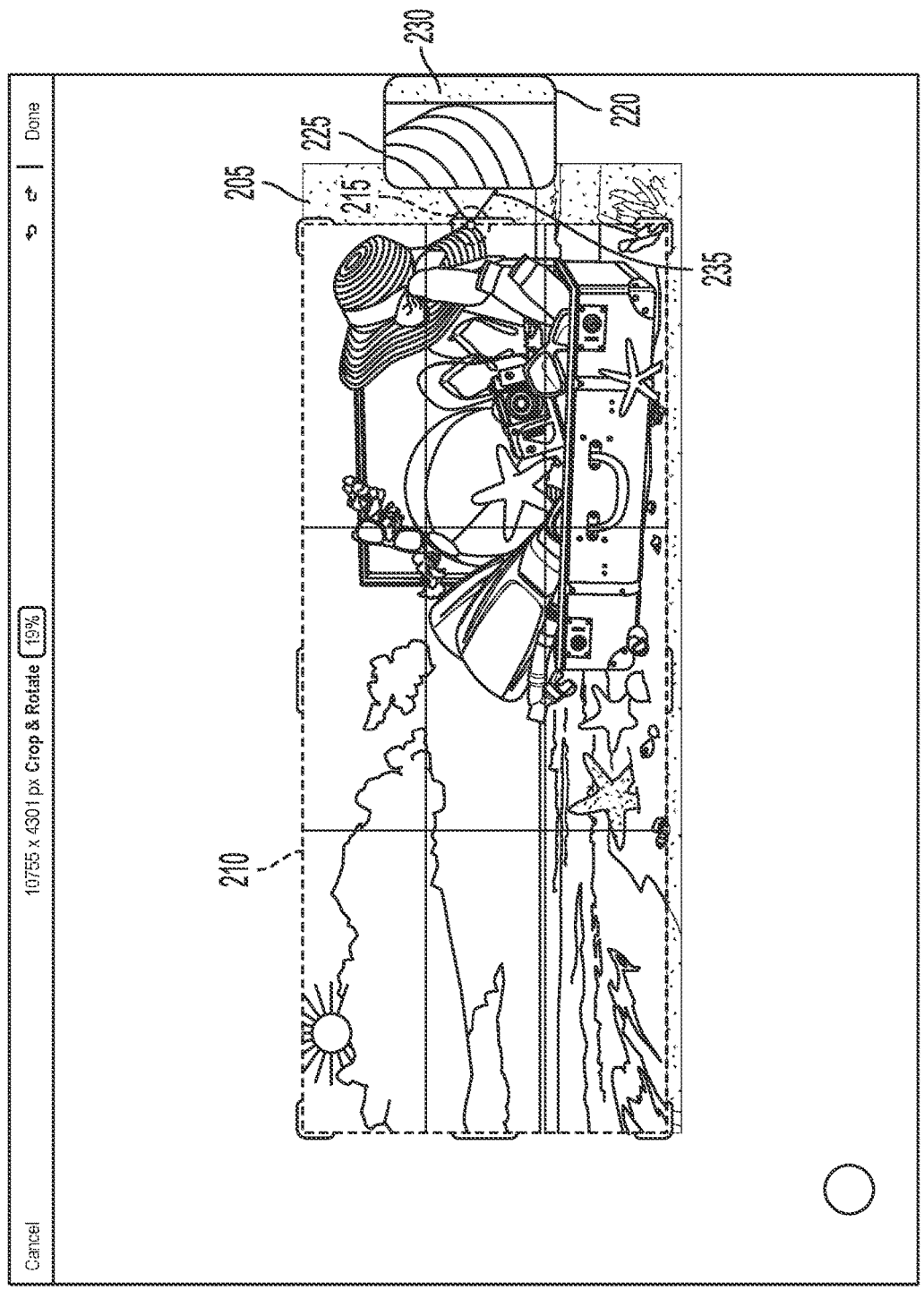
FIG. 2 illustrates an example image being edited and showing an edge zoom-loupe, according to some embodiments.
Figure 10:
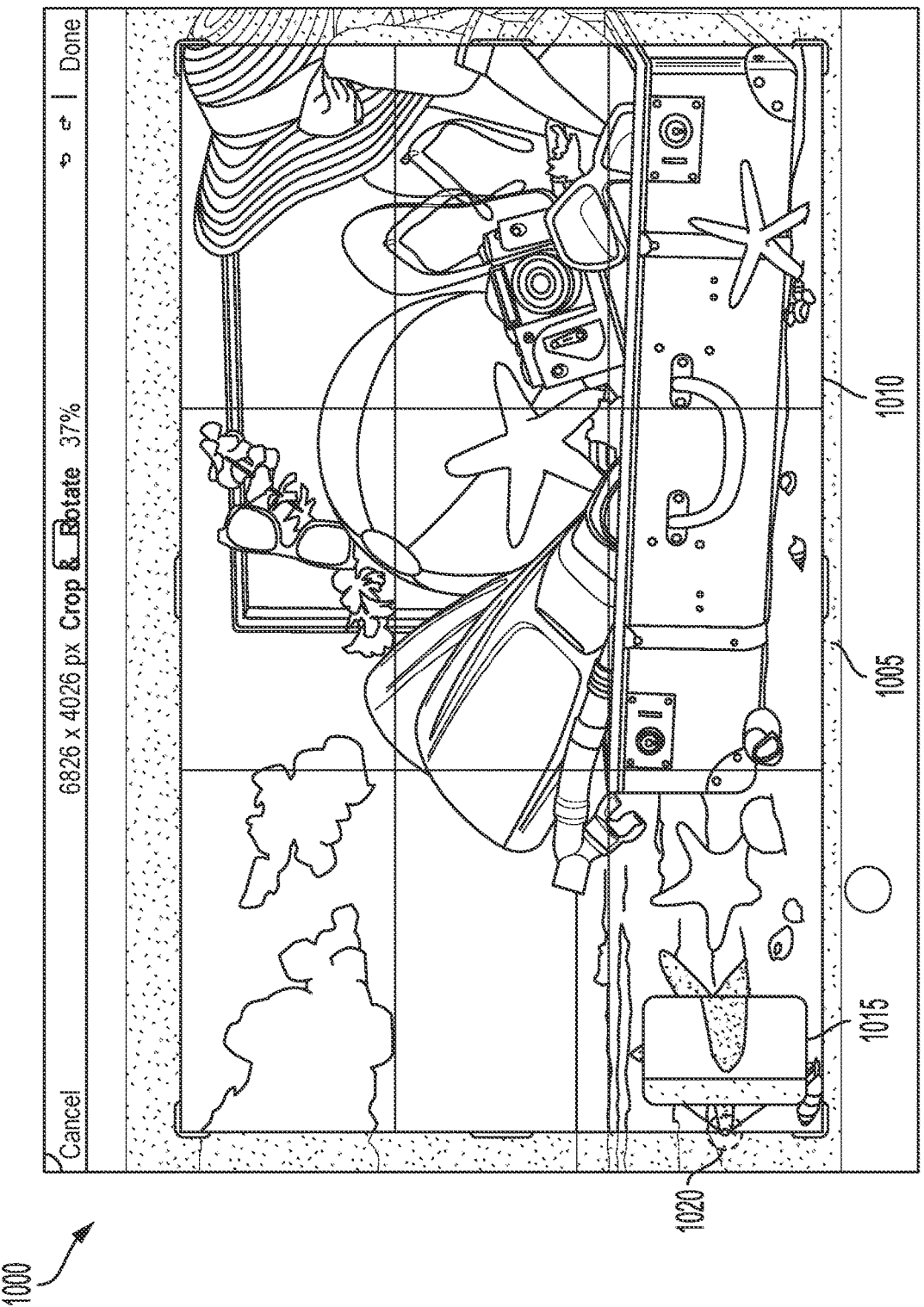
FIG. 10 illustrates an example image being edited and showing an edge zoom-loupe within the crop rectangle.

FIG. 2 illustrates an example graphical user interface 200 of an image editing system performing a crop function with a selection-point edge zoom-loupe 230. The image 205 is within the image editing system for editing and may be stored in memory of the image editing system. The crop function is engaged, and a crop rectangle 210 is displayed in the graphical user interface. The user may select the edge of the crop rectangle 210 at the selection point 215 using a selection tool such as, for example, a mouse or the user's finger. The selection point 215 may be identified as previously described by selecting a point on the edge of the crop rectangle 210 that is closest to the actual selection point of the user. In response, the selection-point edge zoom-loupe 230 is generated by, for example, selection point subsystem 110. The type of zoom-loupe is selected based on the location of the selection point 215, and the magnification factor of the selection-point edge zoom-loupe 230 are selected to provide a helpful view of the portion of the image under the selection point using the unused portion of the graphical user interface 200. The image depicted in the selection-point edge zoom-loupe 230 may be selected from a snapshot stored in memory of the image 205. Generation of the selection-point edge zoom-loupe 230 are based at least in part on the size of the screen and specifically on the size of the graphical user interface screen area available for use. In FIG. 2, there is substantial unused graphical user interface screen real estate (i.e., the area of the graphical user interface 200 outside the displayed image space), and the selection-point edge zoom-loupe 230 is a portion of approximately one quarter the length of the vertical edge of the crop rectangle 210. The magnification factor of the portion of the image displayed in the selection-point edge zoom-loupe 230 is slightly greater than the magnification factor of the image 205, providing a magnified view. The edge selection-point zoom-loupe 230 has two portions. The first portion 225 is the area of the image 205 that is displayed in the selection-point edge zoom-loupe 230 that is within the crop rectangle 210 and will not be removed by the crop function. The second portion 220 is the portion outside the crop rectangle 210 that will be removed by the crop function. The first portion 225 and the second portion 220 are divided by a demarcation line indicated by shading of the second portion 220 as displayed in the selection-point edge zoom-loupe 230 for the user to identify the cropped area. The selection-point edge zoom-loupe 230 is positioned such that approximately 25% of the selection-point edge zoom-loupe 230 shows the second portion 220. Area 235 is a shaded region that is formed by two connector lines. The first connector line spans from the selection point 215 to the top end of the demarcation line. The second connector line spans from the selection point 215 to the bottom end of the demarcation line. The area 235 is enclosed by the two connector lines and the selection-point edge zoom-loupe 230. Area 235 is transparently shaded to ensure the user can see portions of the image that may be underneath area 235. The selection-point edge zoom-loupe 230 is spaced a distance from the image 205 and crop rectangle 210. As previously described, the user may move the selection point 215 by, for example, sliding his or her finger along the right edge of the crop rectangle 210. In doing so, the selection-point edge zoom-loupe 230 will follow the movement along the edge with the selection point 215. Additionally, the user may slide the crop rectangle edge right and left to resize the crop rectangle, which will also cause the selection-point edge zoom-loupe 230 to move right and left on the screen at least until the edge of the screen is reached. If the user moves the crop rectangle to the far right edge of the graphical user interface screen, the selection-point edge zoom-loupe 230 will move inside the crop rectangle when there is not sufficient space outside the crop rectangle. An example of a zoom-loupe within the crop rectangle is shown in FIG. 10.

Figure 3:
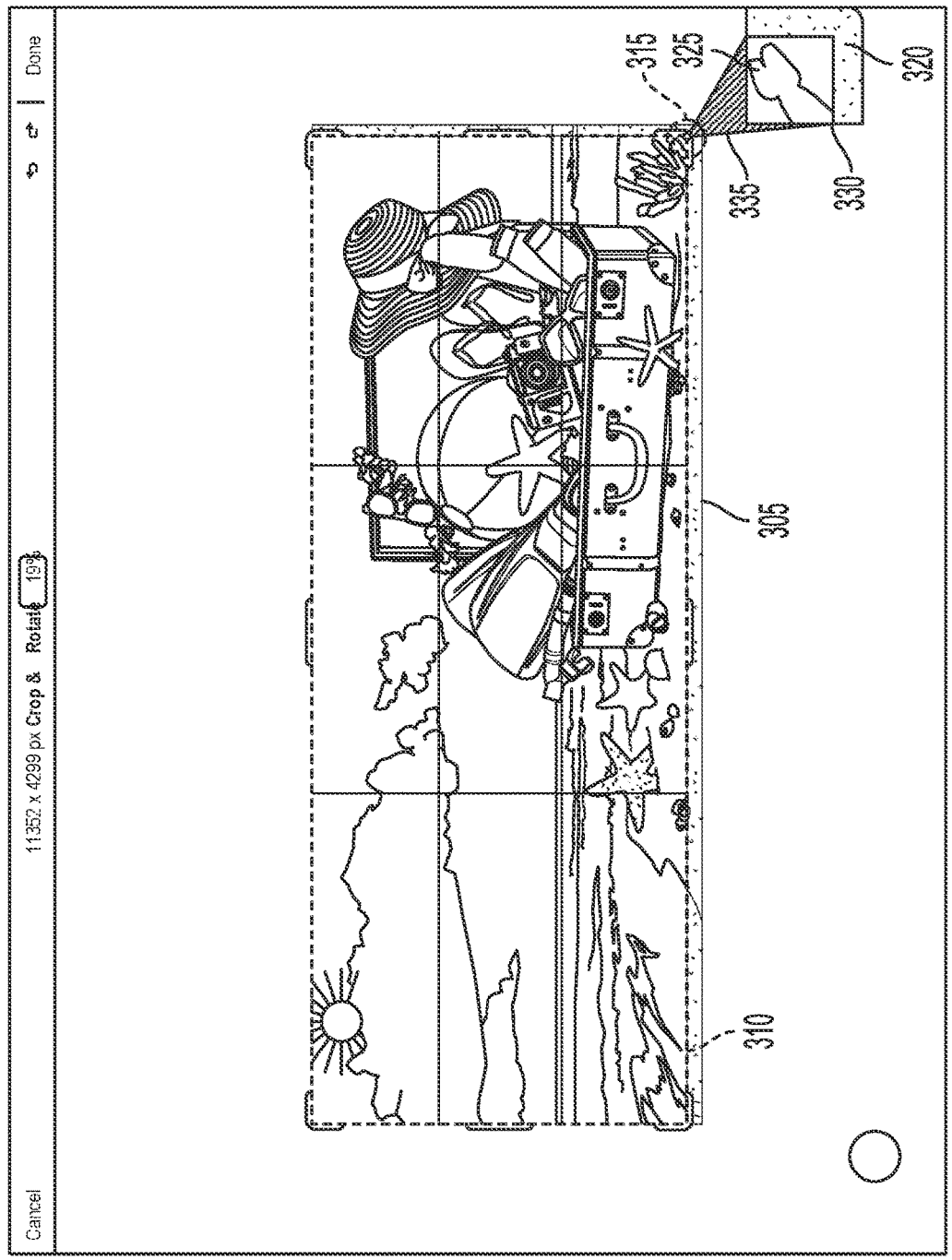
FIG. 3 illustrates an example image being edited and showing a corner zoom-loupe, according to some embodiments.
Figure 9:
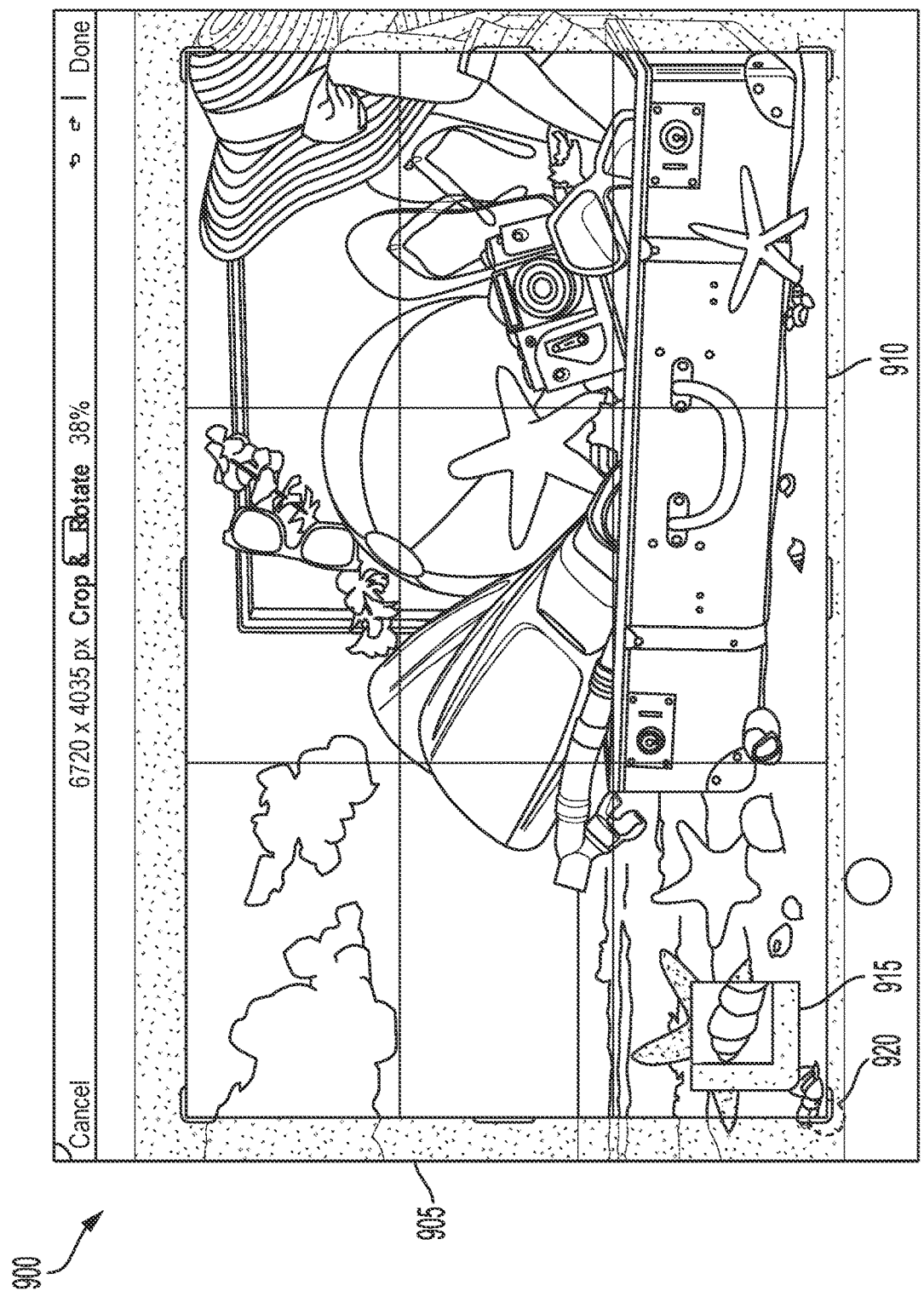
FIG. 9 illustrates an example image being edited and showing a corner zoom-loupe within the crop rectangle.

FIG. 3 illustrates an example graphical user interface 300 of an image editing system performing a crop function with a selection-point corner zoom-loupe 330. The image 305 is within the image editing system for editing and may be stored in memory of the image editing system. The crop function is engaged, and a crop rectangle 310 is displayed in the graphical user interface. The user may select the corner of the crop rectangle at the selection point 315 using a selection tool such as, for example, a mouse or the user's finger. The selection point 315 may be identified as previously described by selecting a corner of the crop rectangle 310 that is closest to the actual selection point of the user by, for example, selection point subsystem 110. When the actual selection point of the user is within a threshold distance of a corner of the crop rectangle 310 a selection-point corner zoom-loupe 330 may be generated. In response, the selection-point corner zoom-loupe 330 is generated by, for example, selection point subsystem 110. The dimensions of the selection-point corner zoom-loupe 330 are selected to provide a helpful view of the portion of the image under the selection point 315 using the unused portion of the graphical user interface. In FIG. 3, there is substantial unused graphical user interface screen real estate (i.e., the area of the graphical user interface outside the displayed image space), and the selection-point corner zoom-loupe 330 has square dimensions. The zoom-loupes may have rounded corners as shown in some embodiments. In FIG. 3, the side dimensions are approximately one eighth of the length of the horizontal edge of the image. The magnification factor of the portion of the image displayed in the selection-point corner zoom-loupe 330 is substantially greater than the magnification factor of the image, providing a magnified view. The magnification factor of the selection-point corner zoom-loupe 330 is selected based on the magnification factor of image 305, and therefore could be less than 100% in some embodiments. The selection-point corner zoom-loupe 330 has two portions. The first portion 325 is the area of the image that is displayed in the selection-point corner zoom-loupe 330 that is within the crop rectangle 310 and will not be removed by the crop function, which takes approximately 75% of the selection-point corner zoom-loupe 330. The second portion 320 is the portion outside the crop rectangle 310 that will be removed by the crop function. The first portion 325 and the second portion 320 are divided by a demarcation line that can be seen based on shading of the second portion 320 of selection-point corner zoom-loupe 330 for the user to identify the cropped area. First portion 325 may be highlighted to indicate that it will not be removed by the cropping function. The selection-point corner zoom-loupe 330 is positioned to be within the open screen real estate of the graphical user interface 300. However, there is not enough screen real estate below the image to locate the selection-point corner zoom-loupe 330 at a forty-five degree angle from the corner of the image 305. Instead, the selection-point corner zoom-loupe 330 is moved vertically up from that position to display within the available graphical user interface screen. Area 335 is the area enclosed by selection-point corner zoom-loupe 330 and two connector lines that extend from the selection point 315 to each end of the demarcation line of the selection-point corner zoom-loupe 330. Area 335 can be shaded, and in some embodiments is shaded with a transparent shading so that the image underneath area 335 is visible to the user. selection-point corner zoom-loupe 330 is spaced a distance from the image 305 and crop rectangle 310. The user may slide the crop rectangle corner right and left, up and down, or diagonally to resize the crop rectangle. This movement will cause the selection-point corner zoom-loupe 330 to move right and left on the screen at least until the edge of the screen is reached. If the user moves the crop rectangle to the far edge of the graphical user interface screen, the selection-point corner zoom-loupe 330 will move inside the crop rectangle when there is not sufficient space outside the crop rectangle. An example of a zoom-loupe within the crop rectangle is shown in FIG. 9.

Figure 4:
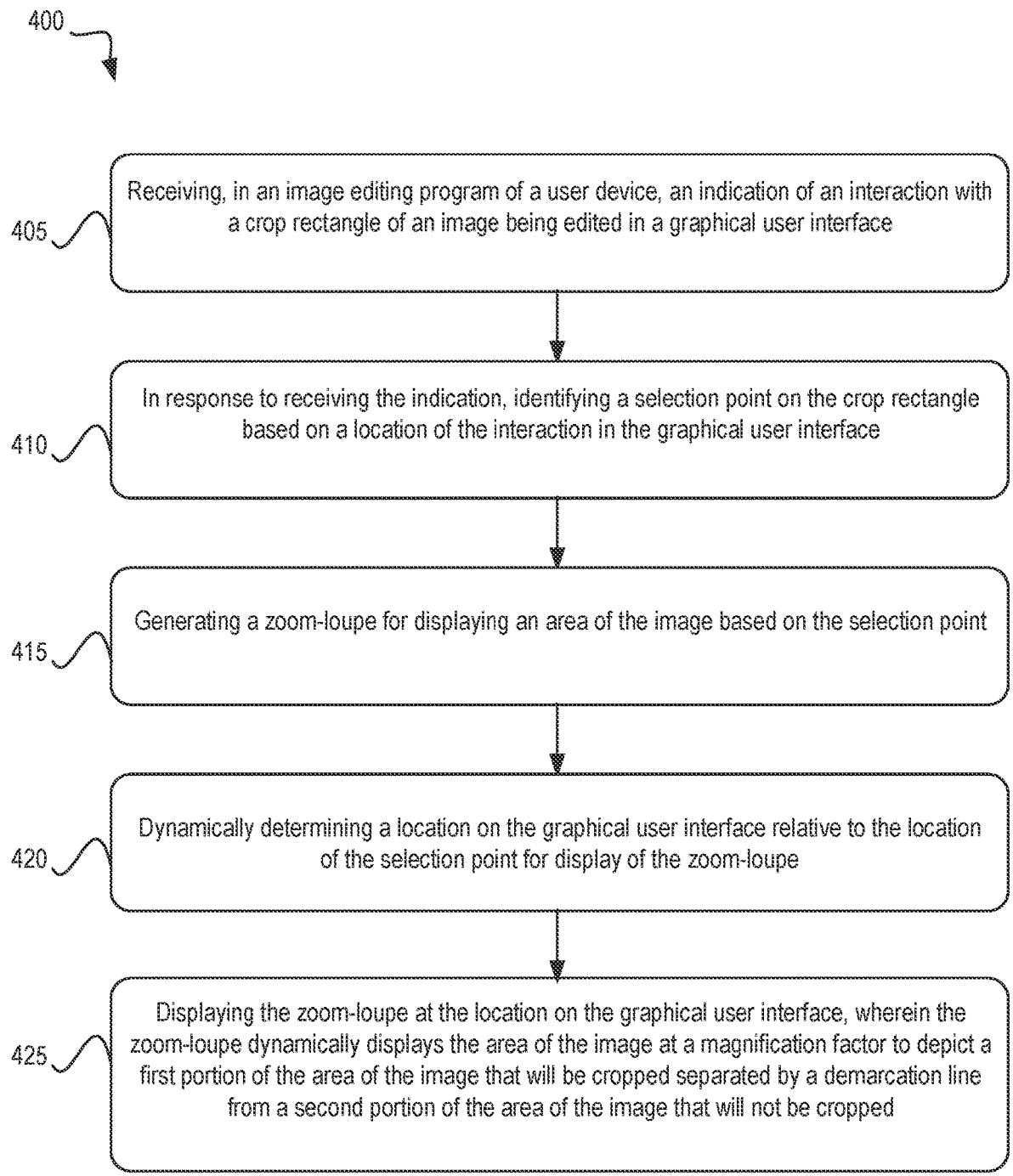
FIG. 4 illustrates a method for generating a zoom-loupe, according to some embodiments.

FIG. 4 illustrates a method 400 for generating a selection-point zoom-loupe. The method 400 may be performed by image editing system 100 and more specifically by selection point subsystem 110 and zoom-loupe location subsystem 120. The method begins at step 405 with the image editing system receiving an indication of an interaction with a crop rectangle of an image being edited in a graphical user interface. When the user selects the edge or corner of the crop rectangle to resize the crop rectangle, an indication of the selection can be provided through input/output subsystem 105 to the selection point subsystem 110.

At step 410, the image editing system, in response to receiving the indication, identifies a selection point on the crop rectangle based on a location of the interaction in the graphical user interface. When the user selects the edge or corner of the crop rectangle, a selection point on the edge or corner of the crop rectangle is determined based on the actual selection point. The coordinates of the selection point are used to identify the corresponding location on the image. For example, the point closest on the crop rectangle is selected that is perpendicular to the actual selection point. In some embodiments, if the actual selection point is within a threshold distance from a corner of the crop rectangle, the corner point of the crop rectangle is the selection point. In some embodiments, the area of the image is identified with the point on the image that corresponds to the selection point centered in the area so that the selection point is centered in the zoom-loupe. In some embodiments, the selection point is located in a different location within the zoom-loupe such as, for example, such that twenty-five percent of the zoom-loupe includes the portion of the image outside the crop rectangle At step 415, the image editing system generates a zoom-loupe for displaying an area of the image based on the selection point. The generation of the zoom-loupe is described with respect to details in FIG. 5 as well as FIG. 1. As described, a magnification factor for the zoom-loupe is selected, an area of the image is selected, a type of the zoom-loupe is selected, and the zoom-loupe is positioned in the graphical user interface to display the area of the image at the magnification factor.

At step 420, the image editing system dynamically determines a location on the graphical user interface relative to the location of the selection point for display of the zoom-loupe. As discussed with respect to FIG. 1, the location is determined based in part on the available screen real estate of the graphical user interface. The edge zoom-loupe is centered when possible with the selection point either horizontally (for horizontal zoom-loupes) or vertically (for vertical zoom-loupes). Corner zoom-loupes are positioned at a forty-five degree angle from the crop rectangle when possible. The distance the zoom-loupe is located from the crop rectangle is based on the available screen real estate within the graphical user interface and is based upon the size of the screen the user is working with.

At step 425, the image editing system displays the zoom-loupe generated at 415 at the location on the graphical user interface determined at step 420. The zoom-loupe is displayed dynamically. As the crop rectangle is resized, the zoom-loupe displays a different area of the image and changes position in the graphical user interface. The zoom-loupe will depict a first portion of the image that will be cropped and a second portion of the image that will not be cropped separated by a demarcation line, which may be indicated by shading or highlighting of the cropped or non-cropped areas, indicating the separation. In some embodiments, the portion that will be cropped will be shaded to indicate removal by the crop function. FIGS. 2 and 3 show examples of the zoom-loupes created by method 400.

Figure 5:
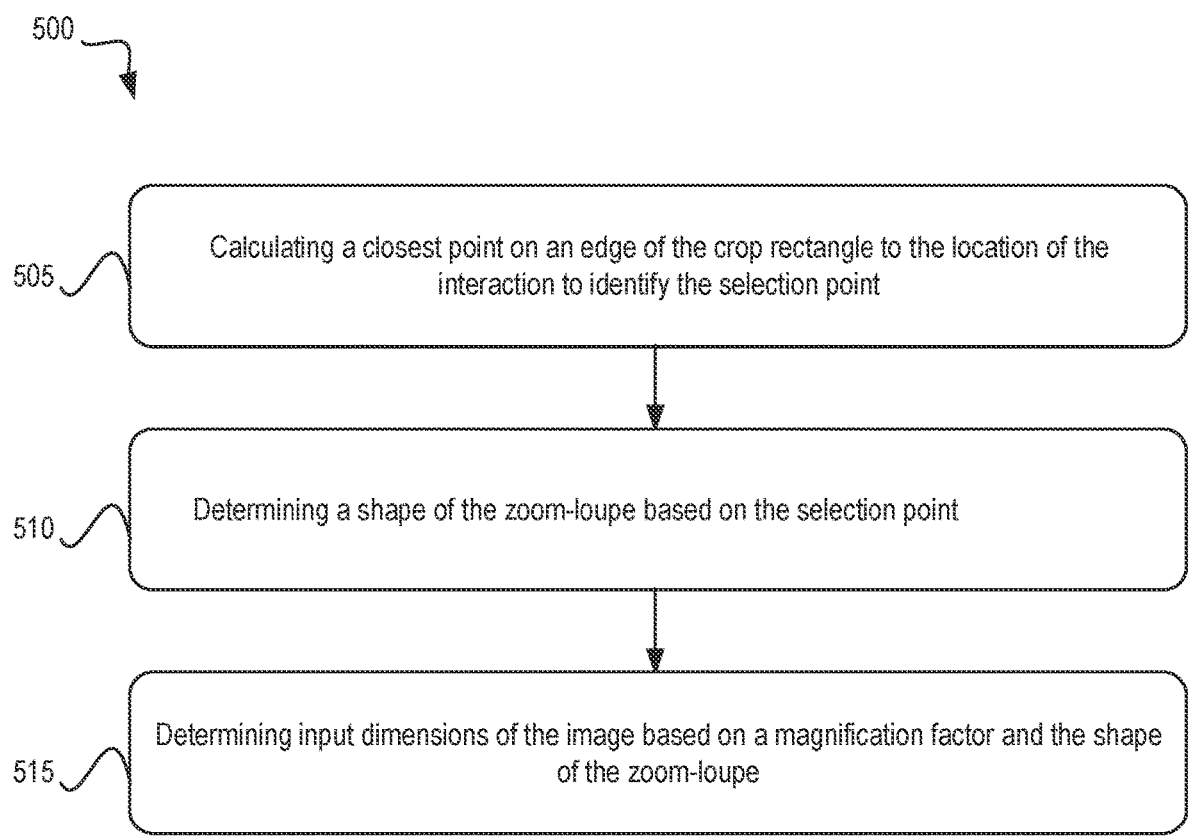
FIG. 5 illustrates a method for determining a location and magnification factor of a zoom-loupe, according to some embodiments.

FIG. 5 illustrates a method 500 for generating the zoom-loupe. The method 500 may be performed by image editing system 100 and more specifically by selection point subsystem 110 or zoom point subsystem 115. The method begins at step 505 with the image editing system calculating a closest point on the edge of the crop rectangle to the location of the interaction to identify the selection point (or the zoom point). When the user selects the crop rectangle edge or corner to resize the crop rectangle or set the zoom point, the user may not make a selection precisely on coordinates of the crop rectangle. If the actual selection point is not within a threshold distance from any point on the crop rectangle, the interaction is ignored. Such a distance may be calculated in number of pixels, for example, and is a sufficient number of pixels given the magnification factor of the image in the graphical user interface, such that the user is not likely trying to select the crop rectangle. When the interaction is ignored as unintentional, a zoom-loupe is not generated. If the actual selection point is within the threshold distance, the selection point subsystem 110 determines whether the user is attempting to select the edge of the crop rectangle or the corner of the crop rectangle. If the actual selection point is within a threshold distance from one of the corners (i.e., the coordinates of the point at which the two edges of the crop rectangle meet) of the crop rectangle, which may be calculated in number of pixels and may be the same or a smaller threshold than that used to ignore the interaction, the selection point used will be the corner of the crop rectangle. If the actual selection point is not within the threshold distance from the corner, the selection point used will be the closest point on the edge of the crop rectangle measured perpendicularly from the edge of the crop rectangle to the actual selection point.

At step 510, the image editing system determines a shape of the zoom-loupe based on the selection point. More specifically, as described with respect to FIG. 1, if the selection point is a corner of the crop rectangle, a corner zoom-loupe is the type selected. If the selection point is along a horizontal edge of the crop rectangle, a horizontal edge zoom-loupe is selected. If the selection point is along a vertical edge of the crop rectangle, a vertical edge zoom-loupe is selected.

At step 515, the image editing system determines input dimensions of the image based on a magnification factor and the shape of the zoom-loupe. As described with respect to FIG. 1, when the magnification factor of the image is high with respect to the screen fit magnification factor at the pyramidal level, the magnification factor for the zoom-loupe is low and vice versa. The shape of the zoom-loupe is determined at step 510, which may be one of the corners or a horizontal edge or vertical edge. A portion of the snapshot captured of the image is used to fill the zoom-loupe, setting a corresponding point on the snapshot of the selection point on the image to be within the zoom-loupe as described above. For example, for a horizontal zoom-loupe, the point on the snapshot corresponding to the selection point on the image is placed centered horizontally in the zoom-loupe, and placed such that approximately 25% of the displayed image is the cropped area and 75% of the displayed image in the zoom-loupe is retained by the crop function. In some embodiments, a smaller portion of the image may be displayed, for example, when the crop line approaches the edge of the image. In such embodiments, the gravity point of the zoom-loupe is used to determine what portion of the image is displayed and where within the zoom-loupe the portion of the image is displayed as described with respect to FIG. 1. For corner zoom-loupes the coordinates of the image associated with the selected corner of the crop rectangle may be located within the zoom-loupe such that, for example, the selection point is approximately twenty-five percent of the distance in from each outside edge of the zoom-loupe. Like edge zoom-loupes, a smaller portion of the image may be displayed when the crop line approaches the edge of the image. The gravity point is used for corner zoom-loupes as well. The dimensions of the zoom-loupe and the magnification factor determine the amount of the image for selection. The area surrounding the corresponding selection point on the image is then used to fill the remainder of the zoom-loupe at the magnification factor.

Figure 6:
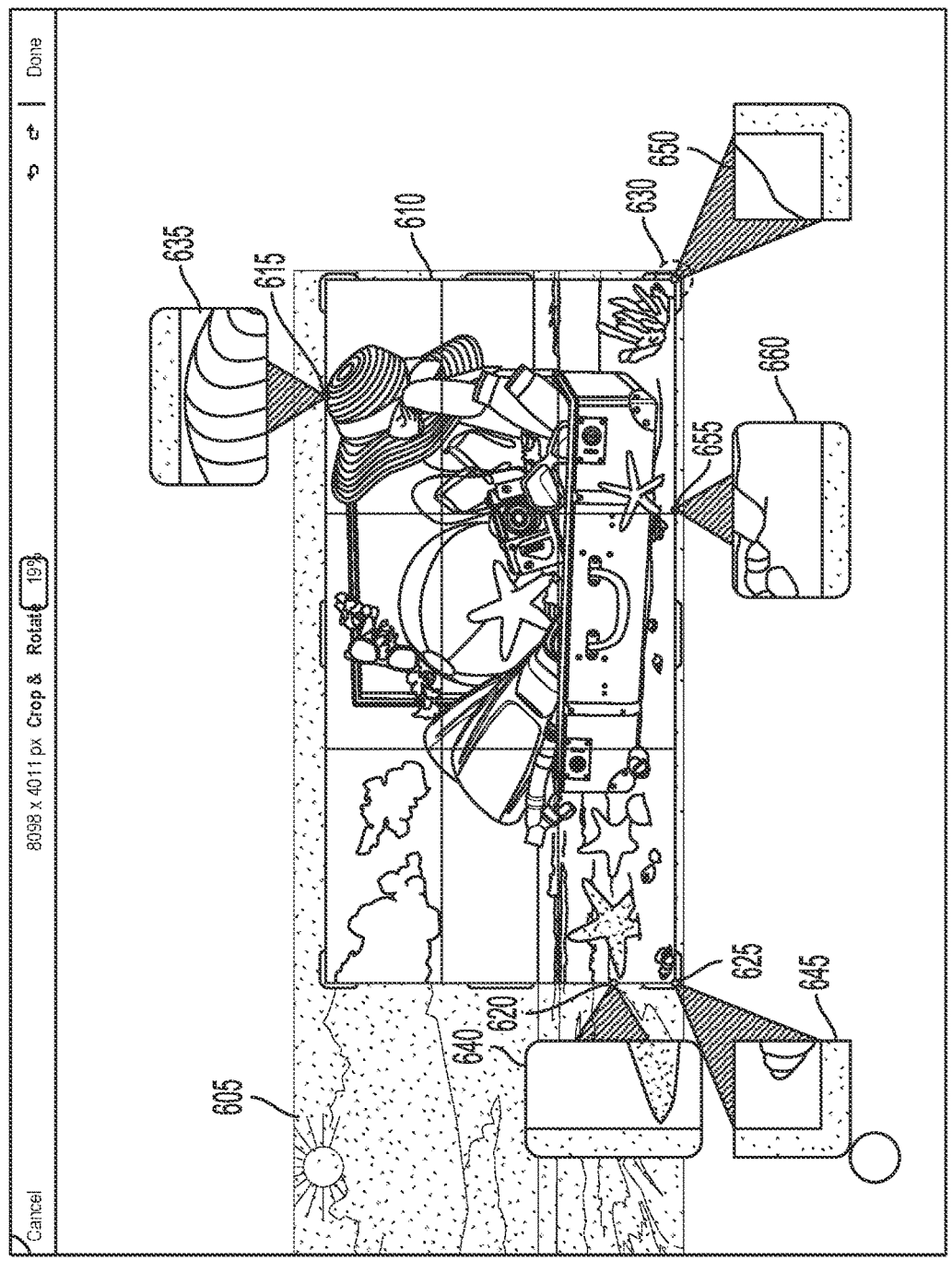
FIG. 6 illustrates an example image being edited and showing a corner zoom-loupe and zoom-point zoom-loupes for edge and corner zoom points, according to some embodiments.

FIG. 6 illustrates an example graphical user interface 600 with an image 605 being edited and showing various zoom-loupes. In the embodiment of FIG. 6, both selection-point zoom-loupe 650 and zoom-point zoom-loupes 635, 640, 645, and 660 are displayed. Image 605 may be edited by the image editing system. Image 605 may be stored in a memory of the image editing system. A user may engage the crop function of the image editing system. The crop rectangle 610 may be used to complete the crop function. The user may select zoom points 615, 620, 625, and 655 as previously described by, for example, tapping the point along the edge of the crop rectangle. The user may then select selection point 630 to resize the crop rectangle 610. In some embodiments, the zoom-loupes 635, 640, 645, 650, and 660 are generated upon indication of the selection point 630. In some embodiments, zoom-loupes 635, 640, 645, and 660 are generated upon selection of the corresponding zoom-points and are made visible on selection of selection point 630 while zoom-loupe 650 is generated on selection of selection point 630. Resizing is done by continuous selection and dragging of the crop rectangle edge or corner, so release of the resizing function can remove display of the zoom-loupes 635, 640, 645, 650, and 660 from the display. Accordingly, in some embodiments, the zoom-point zoom-loupes 635, 640, 645, and 660 are not displayed unless the selection point 630 is selected. If the user lets go of the selection point 630 by, for example, picking his finger up, the zoom-point zoom-loupes 635, 640, 645, and 660 stop displaying.

Once the user selects selection point 630, the zoom-loupe 650 is generated by determining the dimensions and magnification and determining that the zoom-loupe 650 is a corner selection-point zoom-loupe 650 as described with respect to FIG. 1. Then the corner selection-point zoom-loupe 650 is positioned, in this case at a forty-five degree angle from the crop rectangle 610 and spaced within the available screen real estate of the graphical user interface 600. Additionally, edge zoom-point zoom-loupes 635, 645, and 660 are generated by determining the dimensions and magnification and determining that the type of zoom-loupe is edge. Edge zoom-point zoom-loupes 635, 345, and 660 may be generated earlier and made visible when selection point 630 is selected. Additionally, corner zoom-point zoom-loupe 645 is generated by determining the dimensions and magnification and determining that the type of zoom-loupe is corner. Corner zoom-point zoom-loupe 645 may be generated earlier and made visible when selection point 630 is selected. In this embodiment, the portion of the image that is going to be removed by the crop function within each zoom-loupe 635, 640, 645, 650, and 660 is shaded to indicate removal. The portion that is going to be removed is also not as large as the portion that will remain by the crop function. In some embodiments, the portion to be removed may be shown as fifty percent, forty percent, thirty percent, twenty-five percent, or any other amount of the zoom-loupe. The magnification factor of the zoom-loupes 635, 640, 645, and 650 are equivalent as shown in FIG. 6.

As seen in FIG. 6, the advantages of knowing precisely whether certain small objects, such as those depicted in zoom-point edge zoom-loupe 640, will be removed by the crop function can allow the user much more precise cropping ability.

Figure 7:
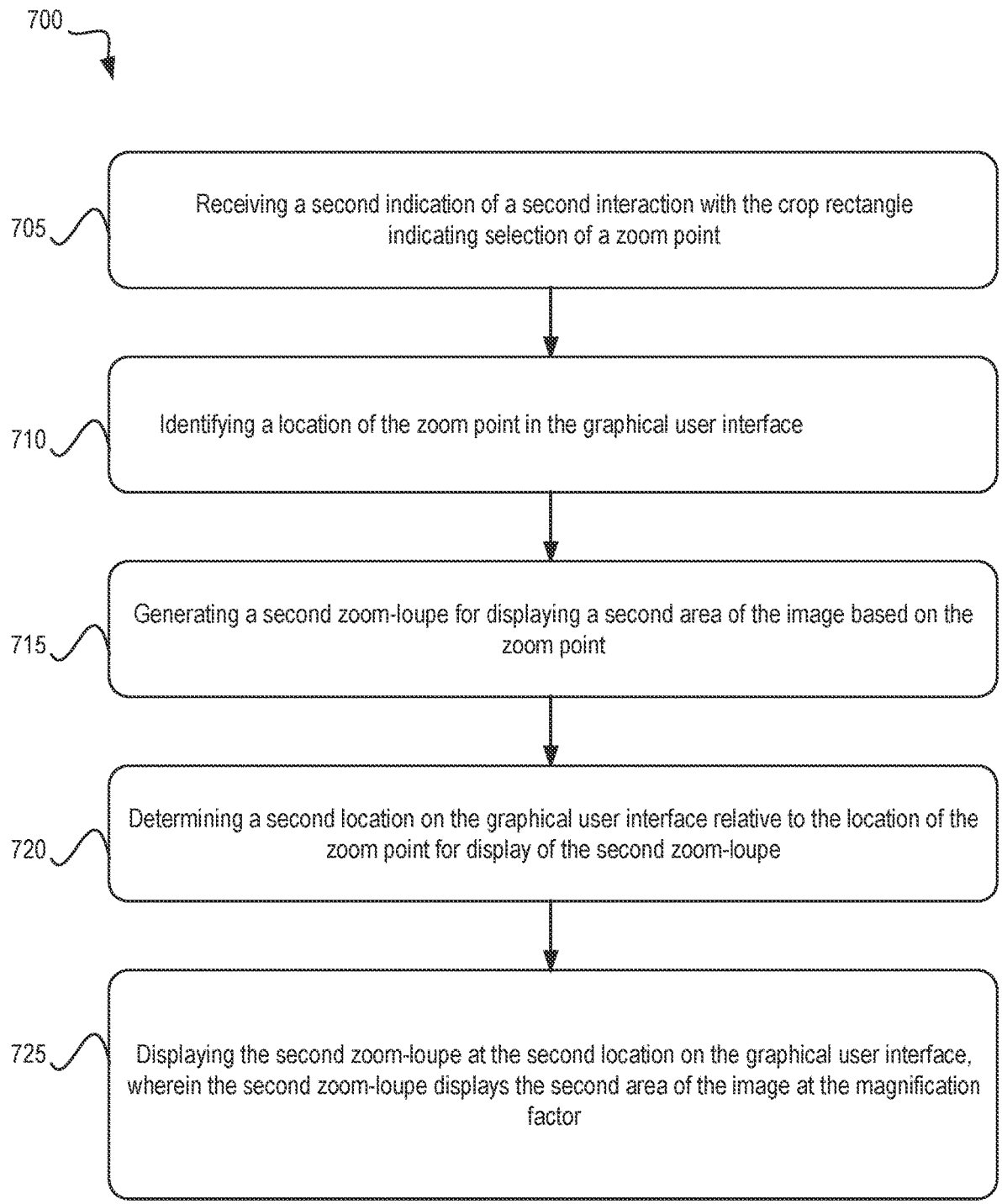
FIG. 7 illustrates a method for generating a zoom-point zoom-loupe, according to some embodiments.

FIG. 7 illustrates a method 700 for generating a zoom-point zoom-loupe. The method 700 may be performed by image editing system 100 and more specifically by zoom point subsystem 115. Method 700 can be performed after or as part of method 400. The method 700 begins at step 705 with the image editing system receiving selection of a second interaction with the crop rectangle indication selection of a zoom point. The user may select the zoom point by putting the image editing system into a zoom point selection mode, for example, by selecting the mode from a selection menu. In some embodiments, a quick tap of the crop rectangle can be interpreted by the image editing system to indicate a zoom point. The actual selection point of the user may not be precisely upon the crop rectangle. At step 710, the image editing system identifies a location of the zoom point in the graphical user interface. When the actual selection point is outside a threshold distance (i.e., too far) from the crop rectangle, the interaction is ignored as unintentional. If the actual selection point is within the threshold distance so it is not ignored, when the actual selection point is within a threshold distance, which may be the same as or smaller than the threshold distance used to determine whether to ignore the interaction, from the corner of the crop rectangle, that corner (i.e., the coordinates where the two edges of the crop rectangle meet) are selected as the zoom point. When the actual selection point is not within the threshold distance from a corner, the closest point on the edge of the crop rectangle (for example, perpendicularly measured) to the actual selection point is used as the zoom point.

At step 715, the image editing system generates a second zoom-loupe for displaying a second area of the image based on the zoom point. The second zoom-loupe is generated as described with respect to FIG. 1. The dimensions, magnification factor, and type of the zoom-loupe and portion of the image displayed in the zoom-loupe is determined. For example, the zoom point corresponds to a position on the displayed image in the graphical user interface, which corresponds with a point in the snapshot used to display in the zoom-loupe. The zoom point location determines the type of zoom-loupe of either a corner or edge zoom-loupe. The magnification factor of the displayed image determines the magnification factor of the snapshot portion in the zoom-loupe. Each determination is made as described in detail with respect to FIG. 1.

At step 720, the image editing system determines a second location on the graphical user interface relative to the location of the zoom point for display of the second zoom-loupe. As discussed with respect to zoom-loupe location subsystem 120 of FIG. 1, the zoom-point zoom-loupe is located with respect to the zoom point.

At step 725, the image editing system displays the second zoom-loupe generated at step 715 at the location determined at step 720. The second zoom-loupe displays the second area of the image at the magnification factor. Further, the portion of the image displayed in the zoom-loupe that is to be cropped may take approximately 25% of the zoom-loupe and be shaded to indicate its removal by the cropping function.

Figure 8:
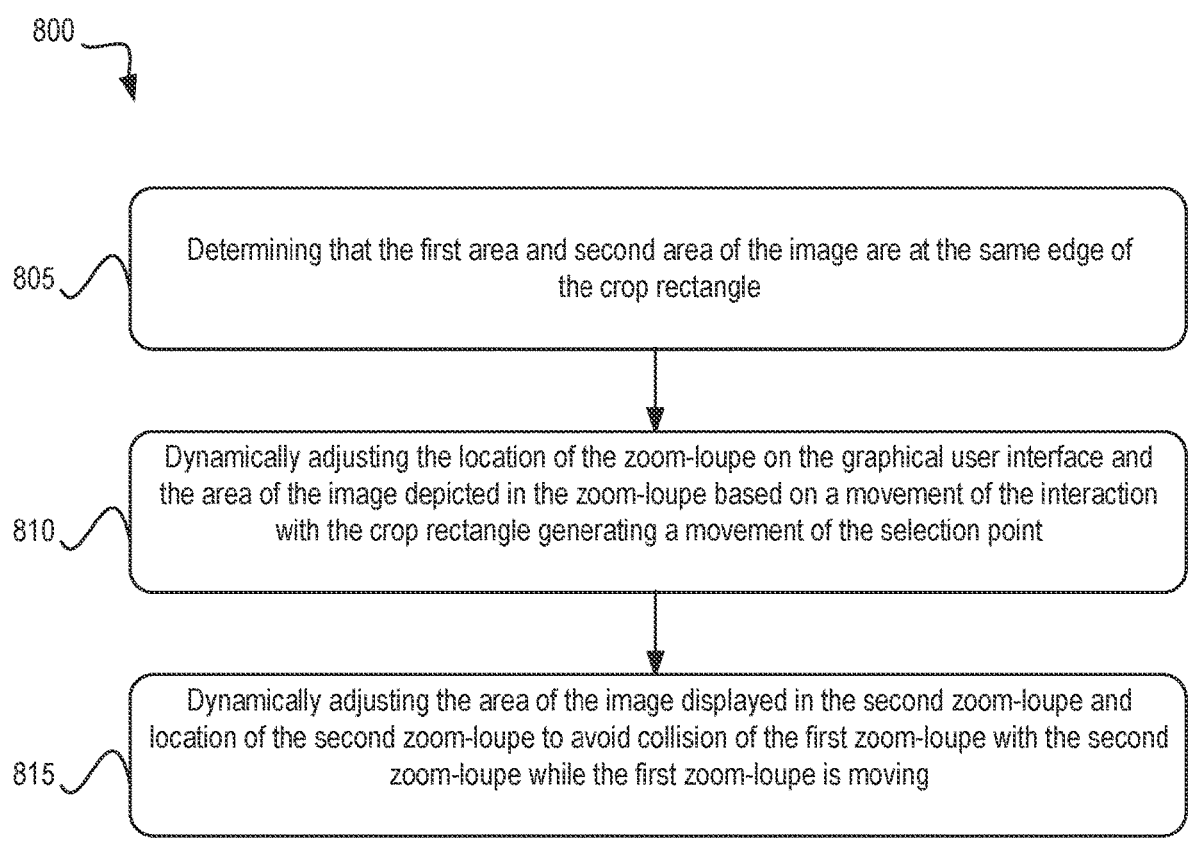
FIG. 8 illustrates a method for avoiding collisions of zoom-loupes, according to some embodiments.

FIG. 8 illustrates a method 800 for avoiding collisions of zoom-loupes. The method 800 may be performed by image editing system 100 and more specifically by zoom-loupe location subsystem 120. Method 800 can be performed after or as a portion of methods 400, 500, or 700. The method begins at step 805 with the image editing system determining that the first and second area of the image are at the same edge of the crop rectangle. Stated differently, the image editing system determines that the area of the image displayed in the selection-point zoom-loupe and the area of the image displayed in the zoom-point zoom-loupe are on the same edge of the crop rectangle.

At step 810, the image editing system dynamically adjusts the area of the image displayed in the first zoom-loupe and location of the first zoom-loupe based on the location of the interaction moving along the edge of the crop rectangle. Accordingly, as the user moves his finger or mouse pointer along the edge of the crop rectangle to move the selection point, the selection-point zoom-loupe dynamically adjusts to this motion by modifying the portion of the image displayed in the zoom-loupe and moving the zoom-loupe to follow the selection point.

At step 815, the image editing system dynamically adjusts the area of the image displayed in the second zoom-loupe and the location of the second zoom-loupe to avoid collision of the first zoom-loupe with the second zoom-loupe while the first zoom-loupe is moving. For example, the zoom-point zoom-loupe may be moved along the edge of the crop rectangle to avoid collision with the selection-point zoom-loupe. In some embodiments, the zoom-point zoom-loupe may move until the selection point comes close to the zoom point. Once the selection point comes close enough (e.g., areas of the image depicted in each zoom-loupe intersect) the zoom point, in some embodiments, the image editing system may combine the selection-point zoom-loupe and the zoom-point zoom-loupe such that only one zoom-loupe is displayed. In other embodiments, once the selection point overlaps the zoom point, the image editing system may swap the location of the zoom-point zoom-loupe with the selection-point zoom-loupe and angle of connector lines could change. The connector lines which connect the selection/zoom point to the demarcation line help in determining the swap and associating selection/zoom points to the respective zoom-loupes. In this way, the zoom-loupes do not overlap.

FIG. 9 illustrates an example graphical user interface 900 in which an image 905 is being edited. In the embodiment of FIG. 9, a selection-point zoom-loupe 915 is displayed. Image 905 may be edited by the image editing system. Image 905 may be stored in a memory of the image editing system. A user may engage the crop function of the image editing system. The crop rectangle 910 may be used to complete the crop function. The user may select selection point 920 to resize the crop rectangle 910. The selection may generate selection-point zoom-loupe 915. Because there is not sufficient space outside crop rectangle 910 above or to the left for zoom-loupe 915 to fit within the graphical user interface screen space, the zoom-loupe 915 is positioned at a forty-five degree angle from the crop rectangle 910 corner within the crop rectangle 910. Edge zoom-loupes similarly may be positioned within the crop rectangle 910 if there is insufficient space outside the crop rectangle as shown with respect to FIG. 10.

FIG. 10 illustrates an example graphical user interface 1000 in which an image 1005 is being edited. In the embodiment of FIG. 10, a selection-point zoom-loupe 1015 is displayed. Image 1005 may be edited by the image editing system. Image 1005 may be stored in a memory of the image editing system. A user may engage the crop function of the image editing system. The crop rectangle 1010 may be used to complete the crop function. The user may select selection point 1020 to resize the crop rectangle 1010. The selection may generate selection-point zoom-loupe 1015. Because there is not sufficient space outside crop rectangle 1010 above or to the left for zoom-loupe 1015 to fit within the graphical user interface screen space, the zoom-loupe 1015 is positioned within the crop rectangle 1010.

Figure 11:
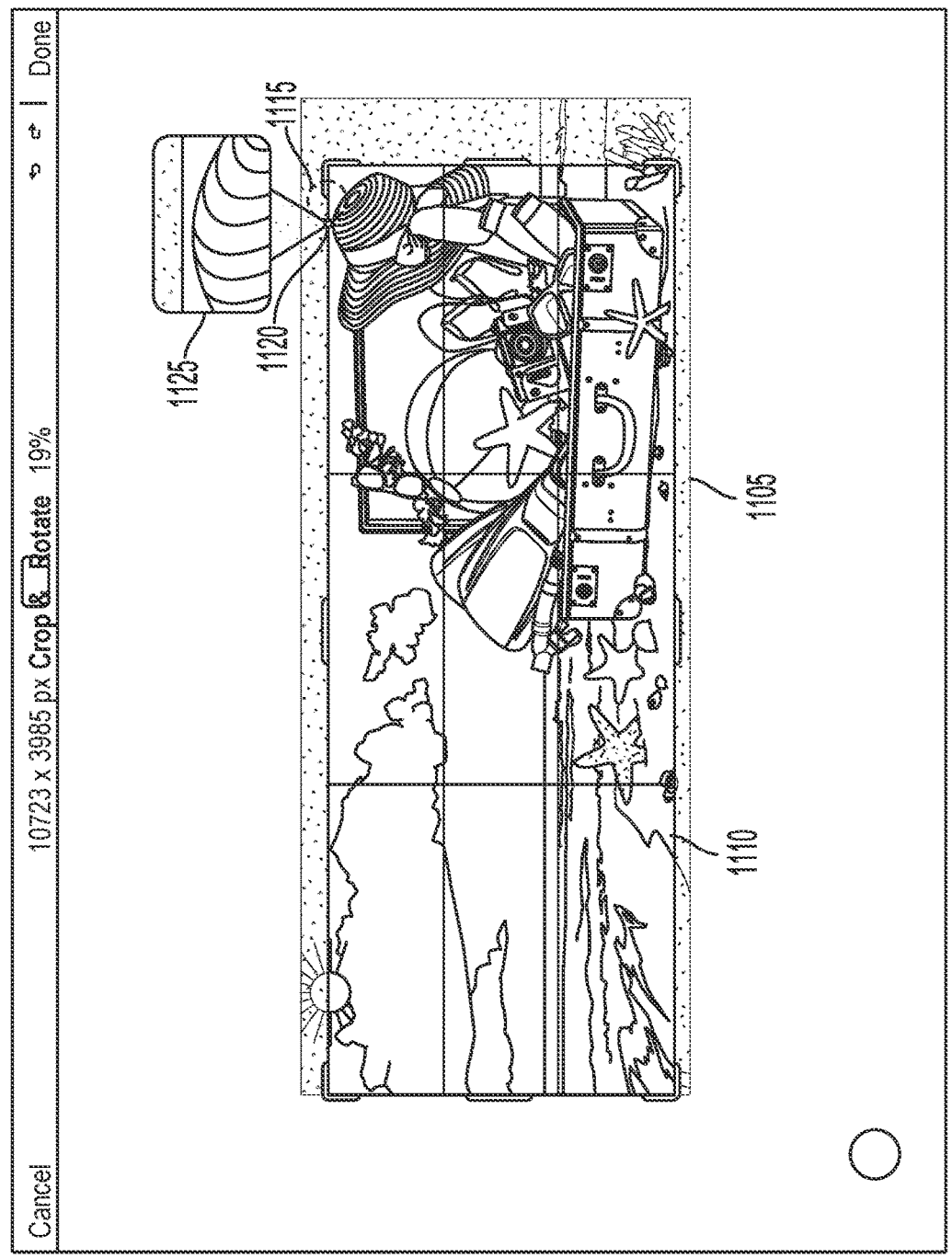
FIG. 11 illustrates an example image being edited and showing a single zoom-loupe for a zoom point close to a selection point.

FIG. 11 illustrates an example graphical user interface 1100 in which an image 1105 is being edited. In the embodiment of FIG. 11, a zoom-point zoom-loupe 1125 is displayed. Image 1105 may be edited by the image editing system. Image 1105 may be stored in a memory of the image editing system. A user may engage the crop function of the image editing system. The crop rectangle 1110 may be used to complete the crop function. The user may select selection point 1115 to resize the crop rectangle 1110. Zoom point 1120 may be a previously selected zoom point 1120. Because selection point 1115 is within a threshold distance of zoom point 1120, the creation of a zoom-loupe for each would be repetitive and create visual difficulty. Accordingly, rather than generating a new zoom-loupe, the zoom-point zoom-loupe 1125 is used for the selection point 1115. If the user were to slide selection point 1115 along the edge of crop rectangle 1110, a zoom-loupe may be generated. Alternatively, the zoom-loupe 1125 may follow the movement.

Examples of Computing Environments for Implementing Certain Embodiments

Figure 12:
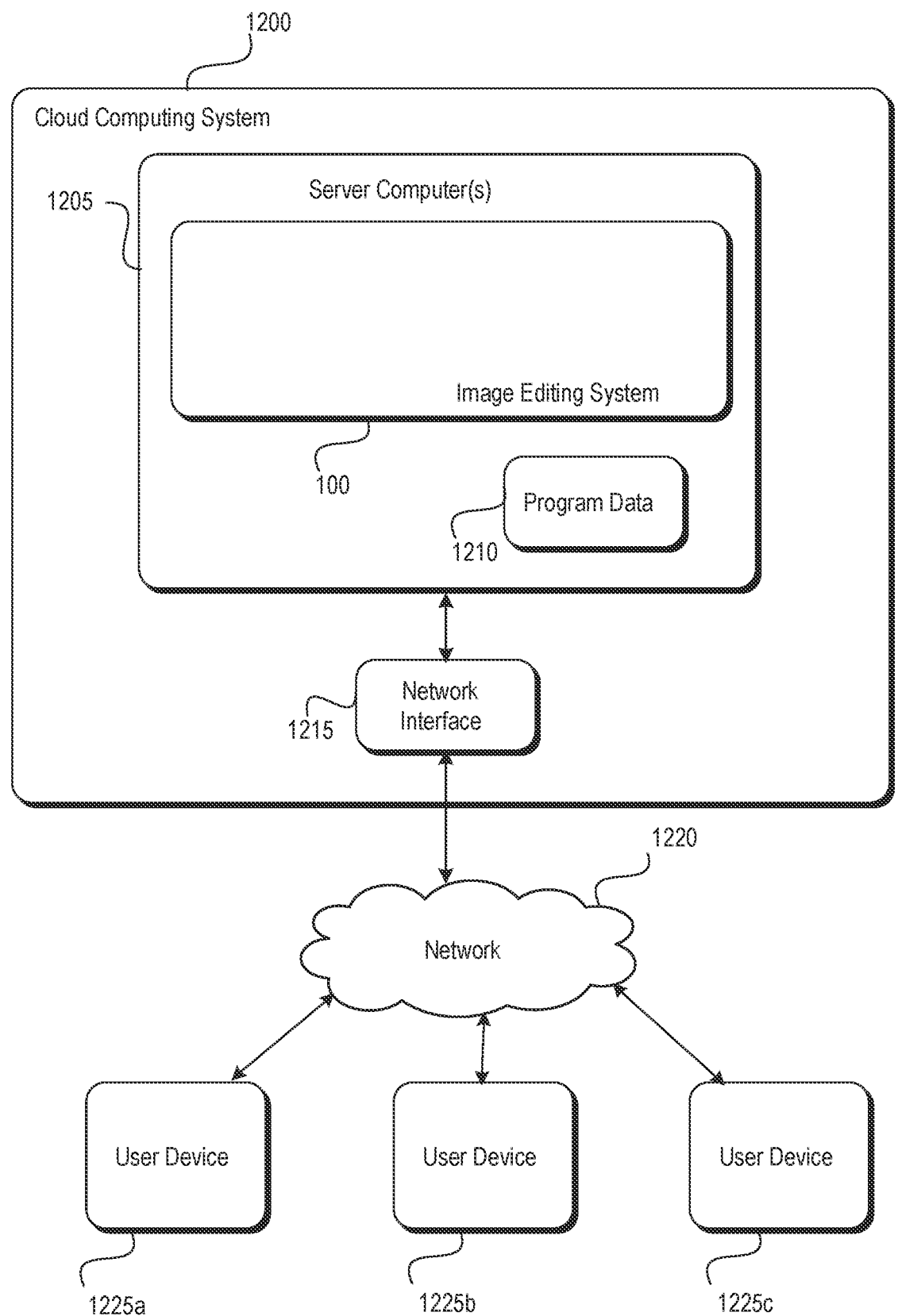
FIG. 12 illustrates an example of a computing system for implementing certain embodiments described herein.
Figure 13:
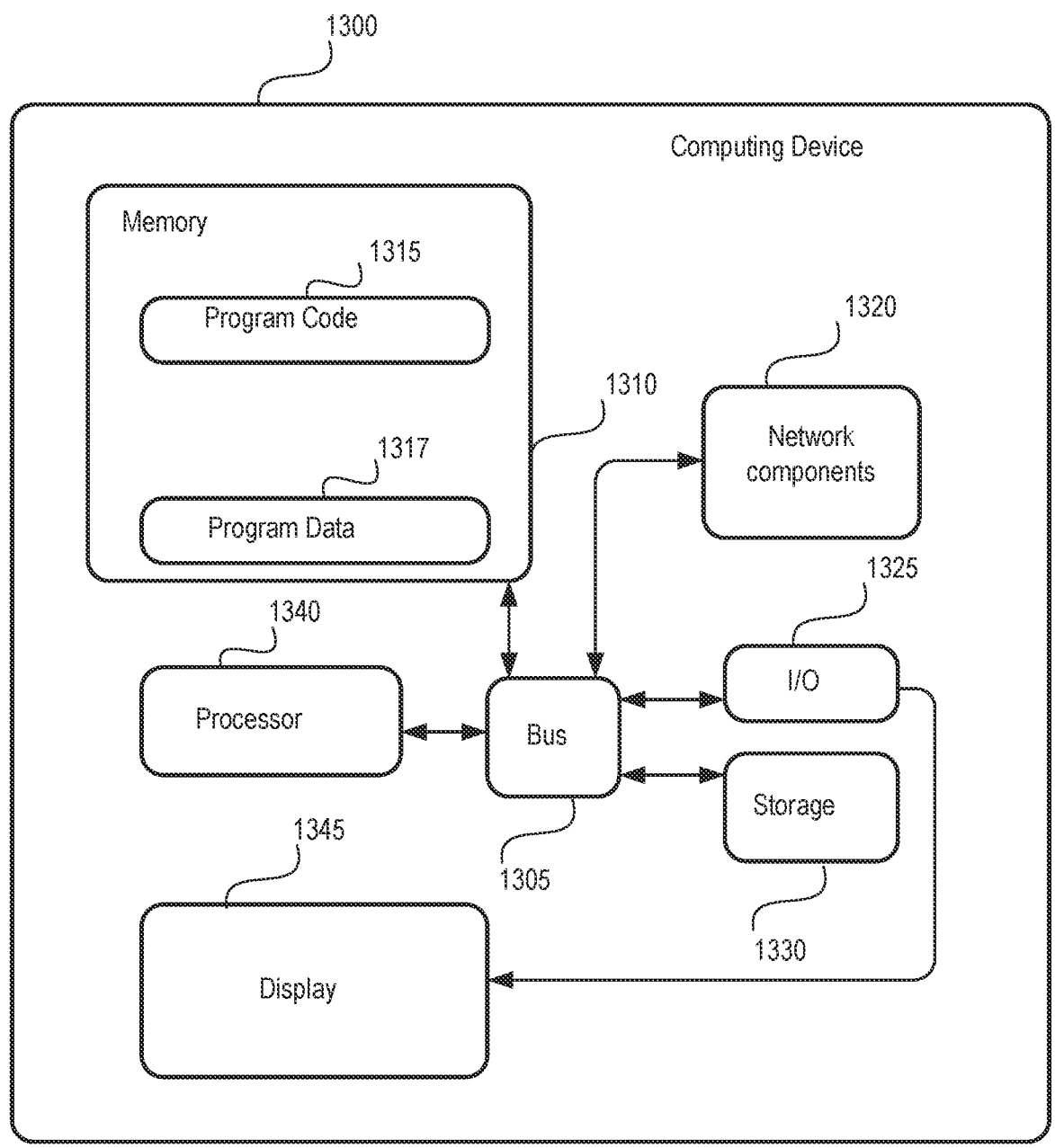
FIG. 13 illustrates an example of a cloud computing system for implementing certain embodiments described herein.

Any suitable computing system or group of computing systems can be used for performing the operations described herein. For example, FIG. 13 depicts an example of computing device 1300 that may be at least a portion of image editing system 100. The implementation of the computing device 1300 could be used for the image editing system 100 or any user device as described herein. In an embodiment, a single image editing system 100 having devices similar to those depicted in FIG. 13 (e.g., a processor, a memory, etc.) combines the one or more operations and data stores depicted as separate subsystems in FIG. 1. Further, FIG. 12 illustrates a cloud computing system 1200 by which at least a portion of the image editing system 100 may be offered.

In some embodiments, the functionality provided by the image editing system 100 may be offered as cloud services by a cloud service provider. For example, FIG. 12 depicts an example of a cloud computing system 1200 offering an image editing service that can be used by a number of user subscribers using user devices 1225a, 1225b, and 1225c across a data network 1220. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 1205.

The remote server computers 1205 include any suitable non-transitory computer-readable medium for storing program code (e.g., an image editing system 100) and program data 1210, or both, which is used by the cloud computing system 1200 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1205 can include volatile memory, non-volatile memory, or a combination thereof.

One or more of the servers 1205 execute the program code 1210 that configures one or more processors of the server computers 1205 to perform one or more of the operations that provide image editing services. As depicted in the embodiment in FIG. 12, the one or more servers providing the services to perform image editing may have access to the image editing system 100 and program data 1210. Any other suitable systems or subsystems that perform one or more operations described herein (e.g., one or more development systems for configuring an interactive user interface) can also be implemented by the cloud computing system 1200.

In certain embodiments, the cloud computing system 1200 may implement the services by executing program code and/or using program data 1210, which may be resident in a memory device of the server computers 1205 or any suitable computer-readable medium and may be executed by the processors of the server computers 1205 or any other suitable processor.

In some embodiments, the program data 1210 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 1215.

The cloud computing system 1200 also includes a network interface device 1215 that enable communications to and from cloud computing system 1200. In certain embodiments, the network interface device 1215 includes any device or group of devices suitable for establishing a wired or wireless data connection to the data networks 1220. Non-limiting examples of the network interface device 1215 include an Ethernet network adapter, a modem, and/or the like. The image editing system 100 is able to communicate with the user devices 1225a, 1225b, and 1225c via the data network 1220 using the network interface device 1215.

FIG. 13 illustrates a block diagram of an example computer system 1300. Computer system 1300 can be any of the described computers herein including, for example, image editing system 100 or server computer 1205. The computing device 1300 can be or include, for example, a laptop computer, desktop computer, tablet, server, or other electronic device.

The computing device 1300 can include a processor 1340 interfaced with other hardware via a bus 1305. A memory 1310, which can include any suitable tangible (and non-transitory) computer readable medium, such as RAM, ROM, EEPROM, or the like, can embody program components (e.g., program code 1315) that configure operation of the computing device 1300. Memory 1310 can store the program code 1315, program data 1317, or both. In some examples, the computing device 1300 can include input/output ("I/O") interface components 1325 (e.g., for interfacing with a display 1345, keyboard, mouse, stylus, user's finger on a touchscreen and the like) and additional storage 1330.

The computing device 1300 executes program code 1315 that configures the processor 1340 to perform one or more of the operations described herein. Examples of the program code 1315 include, in various embodiments, the input/output subsystem 105, selection point subsystem 110, zoom point subsystem 115, zoom-loupe location subsystem 120, or any other suitable systems or subsystems that perform one or more operations described herein (e.g., one or more development systems for configuring an interactive user interface). The program code 1315 may be resident in the memory 1310 or any suitable computer-readable medium and may be executed by the processor 1340 or any other suitable processor.

The computing device 1300 may generate or receive program data 1317 by virtue of executing the program code 1315. For example, image 205, image 305, and image 605 are all examples of program data 1317 that may be used by the computing device 1300 during execution of the program code 1315.

The computing device 1300 can include network components 1320. Network components 1320 can represent one or more of any components that facilitate a network connection. In some examples, the network components 1320 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 1320 can be wired and can include interfaces such as Ethernet, USB, or IEEE 1394.

Although FIG. 13 depicts a single computing device 1300 with a single processor 1340, the system can include any number of computing devices 1300 and any number of processors 1340. For example, multiple computing devices 1300 or multiple processors 1340 can be distributed over a wired or wireless network (e.g., a Wide Area Network, Local Area Network, or the Internet). The multiple computing devices 1300 or multiple processors 1340 can perform any of the steps of the present disclosure individually or in coordination with one another.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A system, comprising:
   one or more processors; and
   a memory having stored thereon a plurality of instructions, the plurality of instructions comprising instructions that, when executed by the one or more processors, cause the one or more processors to:
   in response to a first interaction at a first location in a graphical user interface, identify a selection point on a crop rectangle for cropping an image based on the first location of the first interaction, wherein the image is displayed at a first magnification factor;

generate, based on the selection point, a first zoom-loupe comprising the crop rectangle of the image and a first portion of the image outside of the crop rectangle;
determine, based on the first magnification factor, a second magnification factor for displaying the image in the first zoom-loupe, wherein the second magnification factor is different from the first magnification factor; and
display the first zoom-loupe at a second location in the graphical user interface, wherein the first zoom-loupe displays the image at the second magnification factor.

2. The system of claim 1, wherein the second magnification factor is inversely proportional to the first magnification factor.

3. The system of claim 1, wherein the crop rectangle of the image and the first portion of the image outside of the crop rectangle are separated by a line of demarcation that is not visible.

4. The system of claim 1, wherein the crop rectangle of the image and the first portion of the image outside of the crop rectangle are defined by a shading or a highlighting of the crop rectangle of the image, the first portion outside of the crop rectangle, or both.

5. The system of claim 1, wherein the first portion of the image outside of the crop rectangle comprises a percentage of the first zoom-loupe, and wherein the percentage of the first zoom-loupe is a user-configurable option.

6. The system of claim 1, wherein the plurality of instructions further comprises instructions that, when executed by the one or more processors, cause the one or more processors to:
in response to a second interaction at a third location in the graphical user interface, identify a zoom point based on the third location of the second interaction; and
display a second zoom-loupe at a fourth location in the graphical user interface based on the zoom point, wherein the second zoom-loupe includes a second portion of the image that is different from the crop rectangle of the image and the first portion of the image outside of the crop rectangle.

7. The system of claim 6, wherein the plurality of instructions further comprises instructions that, when executed by the one or more processors, cause the one or more processors to:
in response to a movement of the selection point toward the third location of the second interaction, determine a proximity between the selection point and the zoom point; and
based on the proximity being below a threshold value, combine the first zoom-loupe and the second zoom-loupe such that a single zoom-loupe is displayed.

8. The system of claim 6, wherein the plurality of instructions further comprises instructions that, when executed by the one or more processors, cause the one or more processors to:
in response to a movement of the selection point toward the third location of the second interaction, determine a proximity between the selection point and the zoom point; and
based on the proximity being below a threshold value, swapping the second location of the first zoom-loupe with the fourth location of the second zoom-loupe.

9. The system of claim 6, wherein the first zoom-loupe and the second zoom-loupe are displayed only when a selection tool touches a screen of a user device that includes the graphical user interface.

10. The system of claim 6, wherein the plurality of instructions further comprises instructions that, when executed by the one or more processors, cause the one or more processors to:
display the second zoom-loupe at a fourth location in the graphical user interface, wherein the second zoom-loupe displays the second portion of the image at a third magnification factor that is different from the first magnification factor and the second magnification factor.

11. The system of claim 10, wherein the plurality of instructions further comprises instructions that, when executed by the one or more processors, cause the one or more processors to:
determine, based on a movement of the selection point, that a change in a position of the selection point will cause the first zoom-loupe to collide with the second zoom-loupe; and
dynamically change a position of the second zoom-loupe to avoid the collision.

12. A non-transitory computer-readable medium having stored thereon a plurality of instructions, the plurality of instructions comprising instructions that, when executed by one or more processors, cause the one or more processors to:
in response to a first interaction at a first location in a graphical user interface, identify a selection point on a crop rectangle of an image based on the first location of the first interaction, wherein the graphical user interface comprises a first magnification factor;
generate, based on the selection point, a first zoom-loupe comprising a first area of the image to be cropped;
in response to a second interaction at a second location in the graphical user interface, identify a zoom point on the crop rectangle of the image based on the second location of the second interaction;
generate, based on the zoom point, a second zoom-loupe comprising a second area of the image to be cropped;
display the first zoom-loupe at a third location in the graphical user interface, wherein the first zoom-loupe comprises a second magnification factor that is different from the first magnification factor; and
display the second zoom-loupe at a fourth location in the graphical user interface, wherein the second zoom-loupe comprises a third magnification factor that is different from the first magnification factor and the second magnification factor.

13. The non-transitory computer-readable medium of claim 12, wherein the plurality of instructions further comprises instructions that, when executed by the one or more processors, cause the one or more processors to:
determine that the first interaction comprises a movement of the selection point toward the second location along the same edge of the crop rectangle; and
in response to the movement, dynamically adjust the first area of the image being displayed in the first zoom-loupe by modifying a portion of the image being displayed in the first zoom-loupe to follow the selection point.

14. The non-transitory computer-readable medium of claim 12, wherein the plurality of instructions further comprises instructions that, when executed by the one or more processors, cause the one or more processors to:

determine that the first interaction comprises a movement of the selection point toward the second location along the same edge of the crop rectangle;

determine a proximity between the selection point and the zoom point; and based on the proximity being below a threshold value, combine the first zoom-loupe and the second zoom-loupe such that a single zoom-loupe is displayed.

15. The non-transitory computer-readable medium of claim 12, wherein the plurality of instructions further comprises instructions that, when executed by the one or more processors, cause the one or more processors to:

determine, based on a movement of the selection point, that a collision is impending between the first zoom-loupe and the second zoom-loupe; and dynamically change a position of the second zoom-loupe to avoid the collision.

16. A computer-implemented method comprising:

in response to a first interaction at a first location in a graphical user interface, displaying a first zoom-loupe comprising a first area of an image based on a selection point associated with the first location of the first interaction;

in response to a second interaction at a second location in the graphical user interface, displaying a second zoom-loupe comprising a second area of the image based on a zoom point associated with the second location of the second interaction; and in response to determining that the first area and the second area include a same edge of a crop rectangle, dynamically adjusting: (i) the first area of the image being displayed in the first zoom-loupe or (ii) the second area of the image being displayed in the second zoom-loupe.

17. The method of claim 16, further comprising:

determining a movement of the selection point toward the second location along the same edge of the crop rectangle; and in response to the movement, dynamically adjusting the first area of the image being displayed in the first zoom-loupe based on a change to the first location during the movement of the selection point along the same edge of the crop rectangle by modifying a portion of the first area of the image being displayed in the first zoom-loupe to follow the selection point.

18. The method of claim 16, further comprising:

determining that the first interaction comprises a movement of the selection point toward the second location along the same edge of the crop rectangle; and in response to the movement, dynamically adjusting the second area of the image being displayed in the second zoom-loupe and a location of the second zoom-loupe to avoid a collision with the first zoom-loupe.

19. The method of claim 16, further comprising:

determining that the first interaction comprises a movement of the selection point toward the second location along the same edge of the crop rectangle;

determining a proximity between the selection point and the zoom point; and based on the proximity being below a threshold value, combining the first zoom-loupe and the second zoom-loupe such that a single zoom-loupe is displayed, wherein the single zoom-loupe comprises the first zoom-loupe or the second zoom-loupe.

20. The method of claim 16, further comprising:

determining that the first interaction comprises a movement of the selection point toward the second location along the same edge of the crop rectangle;

determining a proximity between the selection point and the zoom point; and based on the proximity being below a threshold value, swapping a first location of the first zoom-loupe with a second location of the second zoom-loupe, wherein swapping the first location of the first zoom-loupe with the second location of the second zoom-loupe comprises: (i) changing a first angle of a first connector line associated with the first zoom-loupe or (ii) changing a second angle of a second connector line associated with the second zoom-loupe.

* * * * *